United States Patent
Meyer et al.

(10) Patent No.: US 7,779,157 B2
(45) Date of Patent: Aug. 17, 2010

(54) RECOVERING A BLADE IN SCALABLE SOFTWARE BLADE ARCHITECTURE

(75) Inventors: Markus Meyer, Winsen Luhe (DE); Torsten Schulz, Pinneberg (DE); Marco Boerries, Los Altos Hills, CA (US); Venkatachary Srinivasan, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1119 days.

(21) Appl. No.: 11/262,340

(22) Filed: Oct. 28, 2005

(65) Prior Publication Data

US 2007/0101021 A1    May 3, 2007

(51) Int. Cl.
*G06F 15/173* (2006.01)

(52) U.S. Cl. .............. 709/244; 714/4; 714/13; 707/9; 707/203; 707/1; 709/206; 709/226; 709/223; 709/219; 709/201

(58) Field of Classification Search ............. 709/244
See application file for complete search history.

(56) References Cited

U.S. PATENT DOCUMENTS

| | | | |
|---|---|---|---|
| 5,457,478 A | 10/1995 | Frank | |
| 5,475,813 A | 12/1995 | Cieslak et al. | |
| 5,625,757 A | 4/1997 | Kageyama et al. | |
| 5,671,354 A * | 9/1997 | Ito et al. | 726/3 |
| 5,684,952 A | 11/1997 | Stein | |
| 5,742,905 A | 4/1998 | Pepe et al. | |
| 5,764,908 A | 6/1998 | Shoji et al. | |
| 5,814,798 A | 9/1998 | Zancho | |
| 5,852,724 A | 12/1998 | Glenn, II et al. | |
| 5,867,665 A | 2/1999 | Butman et al. | |
| 5,913,032 A * | 6/1999 | Schwartz et al. | 709/213 |
| 5,937,388 A | 8/1999 | Davis et al. | |
| 5,956,719 A | 9/1999 | Kudo et al. | |
| 6,065,054 A * | 5/2000 | Dutcher | |
| 6,069,896 A | 5/2000 | Borgstahl et al. | |
| 6,108,779 A | 8/2000 | Dean et al. | |
| 6,141,690 A | 10/2000 | Weiman | |
| 6,144,959 A * | 11/2000 | Anderson et al. | 707/9 |
| 6,144,999 A * | 11/2000 | Khalidi et al. | 709/219 |
| 6,157,944 A | 12/2000 | Pedersen | |
| 6,170,065 B1 | 1/2001 | Kobata et al. | |
| 6,233,612 B1 | 5/2001 | Fruchtman et al. | |
| 6,256,676 B1 | 7/2001 | Taylor et al. | |
| 6,269,406 B1 | 7/2001 | Dutcher et al. | |
| 6,308,201 B1 | 10/2001 | Pivowar et al. | |

(Continued)

OTHER PUBLICATIONS

Coulouris, G. at al. (1994). *Distributed Systems: Concepts and Design.* Second Edition, Addison-Wesley Publishing Company, pp. 222-233, 311-318.

(Continued)

*Primary Examiner*—Firmin Backer
*Assistant Examiner*—Natisha Cox

(57) ABSTRACT

A system and method for servicing user accounts are disclosed. The system includes one or more blades for servicing the user accounts, where each blade includes software components and hardware components, and each blade serves a group of user accounts, a blade manager for managing states of the one or more blades, logic for detecting a failed blade among the one or more blades, and logic for recovering the failed blade using the states of the one or more blades managed by the blade manager.

27 Claims, 15 Drawing Sheets

U.S. PATENT DOCUMENTS

| | | | |
|---|---|---|---|
| 6,311,205 B1 | 10/2001 | Dutcher et al. | |
| 6,341,316 B1 | 1/2002 | Kloba et al. | |
| 6,489,954 B1 | 12/2002 | Powlette | |
| 6,496,858 B1 | 12/2002 | Frailong et al. | |
| 6,530,083 B1 | 3/2003 | Liebenow | |
| 6,543,004 B1 | 4/2003 | Cagle et al. | |
| 6,571,354 B1 | 5/2003 | Parks et al. | |
| 6,748,570 B1 | 6/2004 | Bahrs et al. | |
| 6,751,661 B1 | 6/2004 | Geddes | |
| 6,769,124 B1 | 7/2004 | Schoening et al. | |
| 6,813,770 B1 | 11/2004 | Allavarpu et al. | |
| 6,857,123 B1 | 2/2005 | Nuxoll et al. | |
| 6,865,157 B1 | 3/2005 | Scott et al. | |
| 6,868,444 B1 | 3/2005 | Kim et al. | |
| 6,931,454 B2 | 8/2005 | Deshpande et al. | |
| 6,931,519 B1* | 8/2005 | Keller | 713/1 |
| 6,944,662 B2 | 9/2005 | Devine et al. | |
| 6,965,929 B2 | 11/2005 | Kumar | |
| 6,968,345 B1* | 11/2005 | Muhlestein | 707/103 R |
| 7,000,032 B2 | 2/2006 | Kloba et al. | |
| 7,020,662 B2 | 3/2006 | Boreham et al. | |
| 7,051,087 B1 | 5/2006 | Bahl et al. | |
| 7,051,088 B2 | 5/2006 | Sesek | |
| 7,054,955 B2* | 5/2006 | Chen et al. | 709/248 |
| 7,085,822 B1 | 8/2006 | Donatelli et al. | |
| 7,085,824 B2 | 8/2006 | Forth et al. | |
| 7,085,961 B2* | 8/2006 | Chang et al. | 714/13 |
| 7,089,259 B1 | 8/2006 | Kouznetsov et al. | |
| 7,089,297 B1 | 8/2006 | Salas et al. | |
| 7,093,006 B2 | 8/2006 | Sanjeev et al. | |
| 7,158,781 B2* | 1/2007 | Garnett | |
| 7,185,066 B2 | 2/2007 | Noble et al. | |
| 7,194,655 B2* | 3/2007 | Chu et al. | 714/4 |
| 7,200,590 B2 | 4/2007 | Everett-Church et al. | |
| 7,272,849 B2 | 9/2007 | Brown | |
| 7,346,616 B2 | 3/2008 | Ramanujam et al. | |
| 7,349,957 B1 | 3/2008 | Matthews et al. | |
| 7,383,461 B2* | 6/2008 | Buckler et al. | 714/2 |
| 7,529,967 B2* | 5/2009 | Findleton et al. | 714/6 |
| 7,539,862 B2* | 5/2009 | Edgett et al. | 713/168 |
| 2001/0049717 A1* | 12/2001 | Freeman et al. | 709/203 |
| 2002/0124114 A1 | 9/2002 | Bottom et al. | |
| 2002/0194295 A1 | 12/2002 | Mercure et al. | |
| 2003/0028817 A1* | 2/2003 | Suzuyama et al. | 714/4 |
| 2003/0097360 A1* | 5/2003 | McGuire | |
| 2003/0097487 A1 | 5/2003 | Rietze et al. | |
| 2003/0101190 A1 | 5/2003 | Horvitz et al. | |
| 2003/0135555 A1* | 7/2003 | Birrel | |
| 2003/0172138 A1 | 9/2003 | McCormack et al. | |
| 2003/0172139 A1 | 9/2003 | Srinivasan et al. | |
| 2003/0172175 A1 | 9/2003 | McCormack et al. | |
| 2003/0182327 A1* | 9/2003 | Ramanujam | |
| 2003/0212684 A1 | 11/2003 | Meyer et al. | |
| 2003/0233541 A1* | 12/2003 | Fowler | |
| 2004/0003132 A1 | 1/2004 | Stanley et al. | |
| 2004/0024831 A1* | 2/2004 | Yang et al. | 709/208 |
| 2004/0054780 A1 | 3/2004 | Romero | |
| 2004/0088414 A1 | 5/2004 | Flynn et al. | |
| 2004/0143836 A1* | 7/2004 | McCormack et al. | 719/316 |
| 2004/0153697 A1* | 8/2004 | Chang et al. | 714/4 |
| 2004/0254829 A1 | 12/2004 | Tripp | |
| 2005/0015430 A1 | 1/2005 | Rothman et al. | |
| 2005/0015531 A1* | 1/2005 | Yabuta et al. | 710/100 |
| 2005/0060432 A1* | 3/2005 | Husain et al. | 709/246 |
| 2005/0080891 A1 | 4/2005 | Cauthron | |
| 2005/0097360 A1* | 5/2005 | Chu et al. | 713/201 |
| 2005/0182851 A1* | 8/2005 | Buckler et al. | 709/238 |
| 2005/0273645 A1* | 12/2005 | Satran et al. | 714/4 |
| 2006/0259511 A1 | 11/2006 | Boerries et al. | |
| 2007/0014243 A1 | 1/2007 | Meyer et al. | |
| 2007/0014244 A1 | 1/2007 | Srinivasan et al. | |
| 2007/0014277 A1 | 1/2007 | Ebbesen et al. | |
| 2007/0014278 A1 | 1/2007 | Ebbesen et al. | |
| 2007/0014300 A1 | 1/2007 | Breuer et al. | |
| 2007/0014303 A1 | 1/2007 | Schulz et al. | |
| 2007/0014307 A1 | 1/2007 | Srinivasan et al. | |
| 2007/0016632 A1 | 1/2007 | Schulz et al. | |
| 2007/0016636 A1 | 1/2007 | Boerries et al. | |
| 2007/0016646 A1 | 1/2007 | Tendjoukian et al. | |
| 2007/0016676 A1 | 1/2007 | Breuer et al. | |
| 2007/0028000 A1 | 2/2007 | Ebbesen et al. | |
| 2007/0028293 A1 | 2/2007 | Boerries et al. | |
| 2007/0038703 A1 | 2/2007 | Tendjoukian et al. | |
| 2007/0100856 A1 | 5/2007 | Ebbesen | |
| 2007/0100975 A1 | 5/2007 | Srinivasan et al. | |
| 2007/0101022 A1 | 5/2007 | Schulz et al. | |
| 2007/0112880 A1 | 5/2007 | Yang et al. | |

OTHER PUBLICATIONS

International Search Report mailed Jul. 11, 2003, for PCT Application No. PCT/US03/07180 filed Mar. 11, 2003, 1 page.
International Search Report mailed Jun. 23, 2003, for PCT Application No. PCT/US03/07179 filed Mar. 11, 2003, 1 page.
International Search Report mailed Oct. 1, 2003, for PCT Application No. PCT/US03/07182 filed Mar. 11, 2003, 2 pages.
International Search Report mailed Oct. 18, 2004, for PCT Application No. PCT/US04/02033 filed Jan. 21, 2004, 1 page.
International Search Report mailed Oct. 8, 2003, for PCT Application No. PCT/US03/07181 filed Mar. 11, 2003, 1 page.
U.S. Appl. No. 11/796,258, filed Apr. 27, 2007 for Yang at al.
Fitzgerald, A. (Mar. 2003). "Blade-Based Storage Subsystems," *CompactPCI Systems*, 4 Pages.
Nease, L. et al. (Apr. 2002). "Blade Servers: Driving the Standard," *CompactPCI Systems*, 6 pages.
U.S. Appl. No. 11/182,287, filed Jul. 14, 2005 for Schulz et al.
U.S. Appl. No. 11/182,663, filed Jul. 14, 2005 for Meyer et al.
U.S. Appl. No. 11/262,052, filed Oct. 28, 2005 for Srinivasan et al.
U.S. Appl. No. 11/262,340, filed Oct. 28, 2005 for Meyer et al.
U.S. Appl. No. 11/265,549, filed Oct. 28, 2005 for Schulz et al.
Wu, S. (Apr. 2002). "Blade Server—The Booming Server Technology of the Year 2002," *CompactPCI Systems*, 5 pages.
Final Office Action mailed on Nov. 17, 2009, for U.S. Appl. No. 11/262,549, filed Oct. 28, 2005, fifteen pages.
Final Office Action mailed on May 15, 2009, for U.S. Appl. No. 11/262,052, filed Oct. 28, 2005, sixteen pages.
Non-Final Office Action mailed on Sep. 10, 2009, for U.S. Appl. No. 11/262,052, filed Oct. 28, 2005, seventeen pages.
Non-Final Office Action mailed on Jun. 15, 2009, for U.S. Appl. No. 11/262,549, filed Oct. 28, 2005, twelve pages.
Non-Final Office Action mailed on Sep. 24, 2008, for U.S. Appl. No. 11/262,549, filed Oct. 28, 2005, fourteen pages.
Non-Final Office Action mailed on Sep. 18, 2008, for U.S. Appl. No. 11/262,052, filed Oct. 28, 2005, sixteen pages.

* cited by examiner

RECOVERING A BLADE IN SCALABLE SOFTWARE BLADE ARCHITECTURE

CROSS-REFERENCE TO RELATED APPLICATIONS

This application is related to the following patent applications: U.S. application Ser. No. 11/262,052, entitled "Scalable Software Blade Architecture," to Venkatachary Srinivasan et al.; and U.S. application Ser. No. 11/262,549, entitled "Sharing Data in Scalable Software Blade Architecture," to Torsten Schulz et al., which are filed concurrently herewith and are hereby incorporated by reference in their entirety.

FIELD OF THE INVENTION

The present invention relates to the field of providing services to one or more user devices in a communication network. In particular, the present invention relates to a system and method for recovering a blade in scalable software blade architecture.

BACKGROUND OF THE INVENTION

The recent proliferation of electronic devices for communication, information management and recreation has moved routine computing power away from the desk-bound personal computer. Users are using devices such as cell phones, camera phones, personal digital assistants (PDAs) and navigation systems, not only in the office and in the home, but also in the field and on the road. There is a diverse range of possible applications for such devices, including communication, business, navigation, entertainment and even managing basic daily activities. Many users today only use a single device for a single task, for example, using cell phones for making and receiving phone calls. However, these devices are no longer single-function devices. They are capable of creating various types of data, for instance, electronic mail, voice messages, photos, video, etc. Increasing the number of functions of a device increases the level of personalization to the users. It is desirable to provide users a connected-service to connect and access their data wherever they are, with whatever device they are using and whatever service they are connected to.

FIG. 14 illustrates a prior art system for servicing user accounts. The system includes a plurality of client devices 1402, a load balancer 1404, a plurality of stateless servers 1406 (server 1, server 2 . . . server n, etc.), and a large central database server 1408. There are several problems with the prior art system. First, it requires a high cost central database. The reason the central database has a high cost is that it needs to be robust to avoid any significant interruption of service to the user accounts. If the central database fails, millions of user accounts served by the central database are affected. Second, the central database requires a large storage capacity and fast network access time in order to serve the millions of user accounts. Third, the prior art system requires the large storage capacity and the servers to be operational before any service can be offered to the users. In this approach, the system has a high upfront setup cost and is not able to scale its capacities accordingly as the number of user accounts increases. As a result, the system may not be able to take advantages of future hardware and software improvements and cost reductions as technology advances. Fourth, the prior art system requires a load balancer to distribute the load of the user accounts to the various servers in the system, which adds additional delay and cost to the system. Therefore, there is a need for a scalable system to address these issues of the prior art system.

One of the challenges of scalable software blade architecture is that when a blade fails, the system needs to replace the failing blade or transfer the user accounts from the failing blade to other blades in the system behind the scenes. Thus, there is a need for recovering a failing blade seamlessly or with minimal interruption to the service of the user accounts. Moreover, there is also a need for reducing the cost associated with transferring a large amount of data to or from the central database during the recovery of the failing blade.

Another challenge of scalable software blade architecture is to share data between two or more users on different blades. Communication of user data between blades is difficult because the blades are stateless with respect to the user data, which may be shared by one or more devices belong to the user. Thus, there is a need for sharing data between two or more users hosted by different blades while keeping each blade stateless with respect to the data to be shared. In addition, there is a need for sharing data between two or more users hosted by different blades while keeping devices of both users up-to-date with the data according to the settings and capabilities of the user devices.

SUMMARY

In one embodiment, a system for servicing user accounts includes one or more blades for servicing the user accounts, where each blade includes software components and hardware components, and each blade serves a group of user accounts, a blade manager for managing states of the one or more blades, logic for detecting a failed blade among the one or more blades, and logic for recovering the failed blade using the states of the one or more blades managed by the blade manager. In another embodiment, a method for servicing user accounts includes partitioning tasks for servicing the user accounts into one or more blades, where each blade includes software components and hardware components, and each blade serves a group of user accounts, managing states of the one or more blades by a blade manager, detecting a failed blade among the one or more blades, and recovering the failed blade using the states of the one or more blades managed by the blade manager.

BRIEF DESCRIPTION OF THE DRAWINGS

The aforementioned features and advantages of the invention as well as additional features and advantages thereof will be more clearly understandable after reading detailed descriptions of embodiments of the invention in conjunction with the following drawings.

Like numbers are used throughout the figures.

DESCRIPTION OF EMBODIMENTS

Figure 1A:
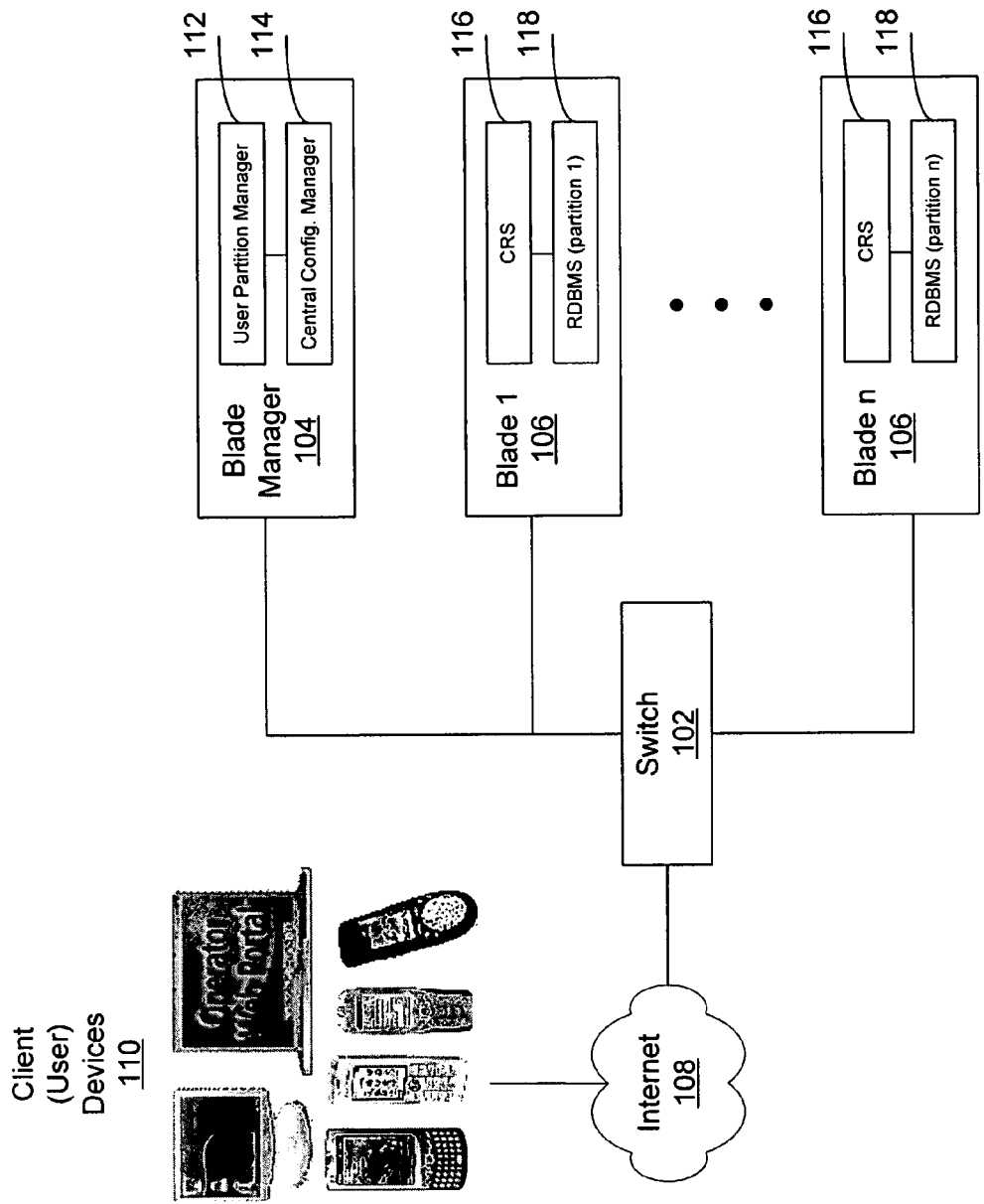
FIG. 1A illustrates a system for servicing user accounts according to an embodiment of the present invention.

The present invention enables recovering a blade in scalable software blade architecture. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description which follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Some examples described herein provide systems and methods for providing an aggregated backend (e.g., comprising one or more server computers) that supports a user account (e.g., such as a Yahoo! email account or the like), where the aggregated backend includes data available on other backends of associated content nodes (e.g., other users accounts, exchanges, devices, etc.). For example, a user may have two or more email accounts, including various applications, such as email, contacts, calendar, and the like associated with each account. A first user account backend may mirror data of a second user account, such that data of the second account is accessible through the first user backend. The aggregated data is principally organized as a connected dataset having separate substructures, e.g., folder or other data file grouping system, provided by different content nodes. In one example, a connected dataset is established with an aggregated backend for each application type, whereby aggregation of two or more substructures, e.g., folder or other data file grouping system, provided by other content nodes also associated with or linked to the connected dataset, is done. In this manner a user may access data stored by two or more backends through one content node associated with the aggregated backend.

A connected-data service enables users to share and access their connected dataset with any device at any time from anywhere. Client devices (also referred to as user devices) may include cellular phones, wireless personal digital assistants, navigation devices, personal computers, game consoles, Internet terminals, and Kiosks. A connected dataset may include emails, contacts, calendar, tasks, notes, pictures, documents, music, videos, bookmarks, and links. A connected-data service is implemented by one or more content router servers (CRS). A CRS may be implemented by one or more computers/servers in different geographical locations. The CRS manages the connected dataset among the different computing devices on which a user may create or store data, including personal computers, mobile devices, servers, and web portals. A scalable software blade architecture includes one or more blades implementing a corresponding CRS for servicing a predefined group of user accounts. Each CRS may have different configurations or versions of hardware and software components. As the number of user accounts increases, the scalable software blade architecture may incrementally add new blades for servicing the new user accounts.

FIG. 1A illustrates a system for servicing user accounts according to an embodiment of the present invention. As shown in FIG. 1A, the system includes a switch 102, a blade manager 104, and one or more blades 106, such as blade 1 to blade n. The switch is connected to the Internet 108, though which a plurality of user devices 110 may access the system. The switch may be one or more hardware instances that are used to route the Internet traffic to the blade servers. The switch directs a user device to the blade that is responsible for managing the user's connected dataset according to the Internet Protocol (IP) address of the blade server or other information included in each request for determining the target blade server. The blade manager 104 includes a user partitioning manager 112, and a central configuration manager 114. Each blade in the system functions as a CRS 116 with its corresponding relational database management system (RDBMS) of the database partition 118. Each blade includes software components and hardware components, and each blade serves a predefined group of user accounts. The software components include one or more versions of operating systems and software applications. The hardware components include one or more versions of hardware platforms and configurations. Interactions between the blade manager and the blades are described in association with FIG. 1B below.

Figure 1B:
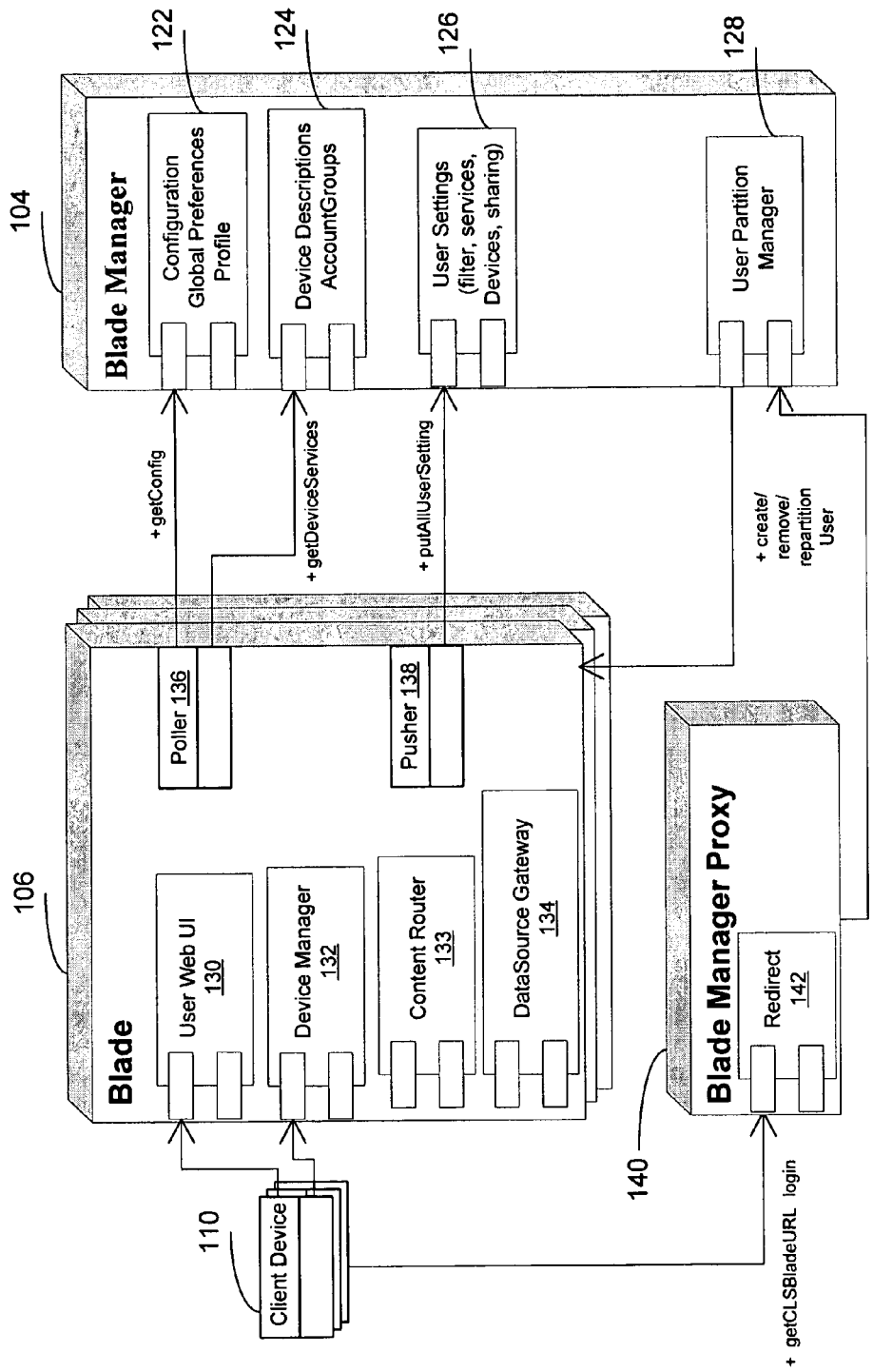
FIG. 1B illustrates a component diagram of the system of FIG. 1A according to an embodiment of the present invention.

FIG. 1B illustrates a component diagram of the system of FIG. 1A according to an embodiment of the present invention. As shown in FIG. 1B, the blade manager 104 managers the states and configurations of user accounts for the one or more blades 106 in the system. It includes a storage for configuration and global preferences profile 122, a storage for device description and account groups 124, a storage for user settings 126, and a user partitioning manager 128. The configuration and global preferences profile 122 includes configuration information applicable to all blades in the system. The device descriptions and account groups 124 includes information about user devices, such as device types (e.g. Symbian device) and software versions for the different device types. The user settings 126 include information such as types of services, user filter settings, and data sharing settings. The blade manager is also responsible for assigning new user accounts to a specific blade according to a set of predetermined requirements, including repartition and disaster recovery requirements when a blade fails. The user partition manager 128 balances the load of servicing user accounts among the blades.

Each blade implements a CRS and includes a user web UI 130, a device manager 132, a content router 133, a DataSource gateway 134, a poller logic 136, and a pusher logic 138. The DataSource gateway 134 includes components for accessing user accounts. For example, it may access IMAP, POP, Exchange, and SyncML accounts through web.de, GMX, or MSN.

The system further includes a blade manager proxy 140 for functioning as a front-end interface between the blade manager 104 and the user devices 110 via the Internet. It is used to shield the blade manager 104 against direct access from the Internet, and thus protects the blade manager from unauthorized accesses. The blade manager proxy 140 includes redirect logic 142 for directing a user device to a new blade in case the blade hosting the device has failed or in case the old blade has moved.

Figure 2A:
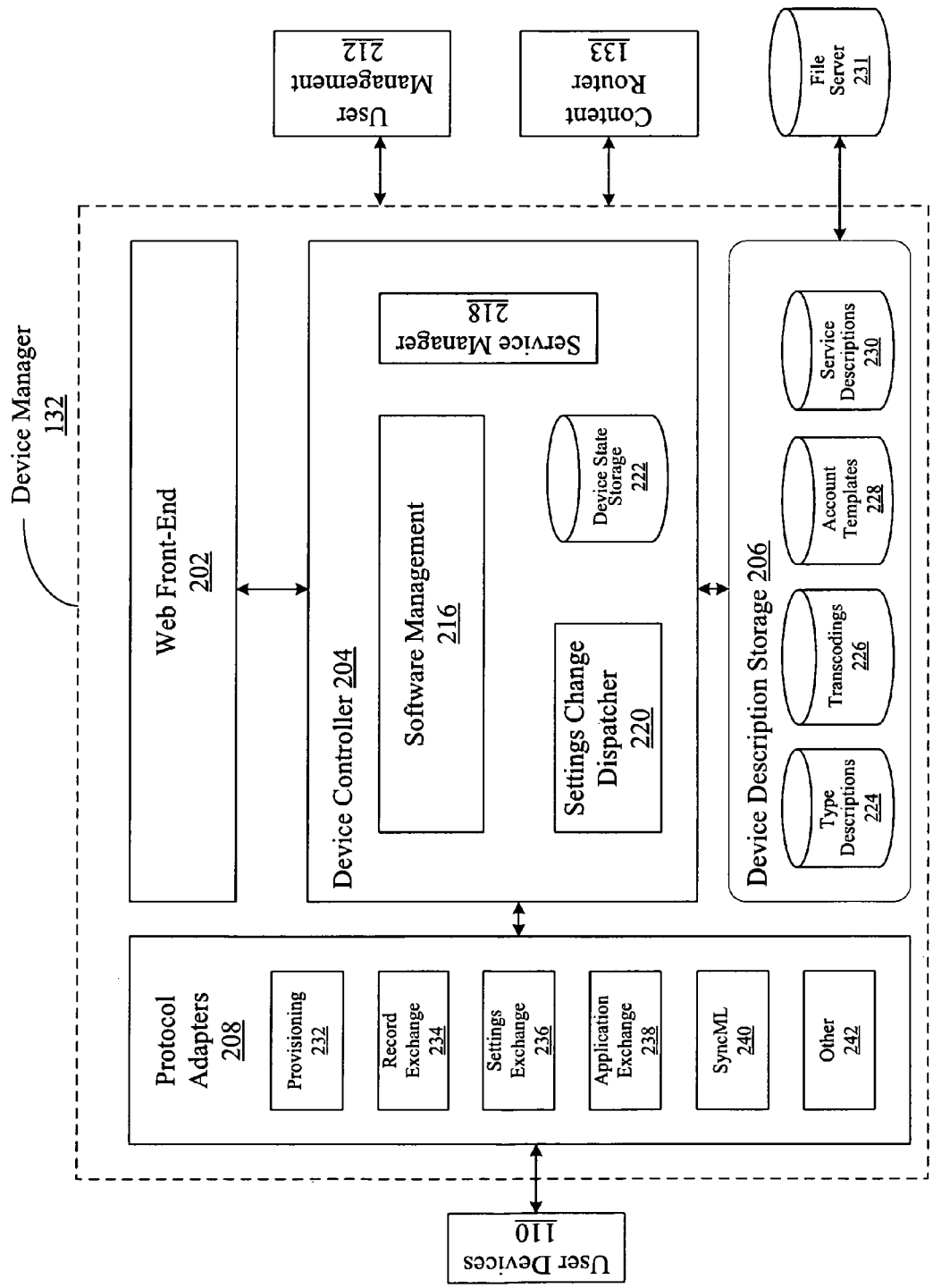
FIG. 2A illustrates an implementation of the device manager of FIG. 1B according to an embodiment of the present invention.

FIG. 2A illustrates an implementation of the device manager of FIG. 1B according to an embodiment of the present invention. The device manager 132 includes a web front-end 202, a device controller 204, a device description storage 206, and a set of protocol adapters 208. The device manager communicates and manages the user devices 110 through the protocol adapters 208. In addition, the device manager communicates with other portions of the content router server through a user management unit 212 and a smart content routing unit 214. The user management unit is the adapter to the user management system of the Internet Service Provider (ISP), for example Yahoo. It interacts with the ISP's user management to obtain permissions for a user or to receive information concerning a user has been removed.

The device controller 204 further includes a software management unit 216, a service manager 218, a settings change dispatcher 220, and a device state storage 222. The software management unit 216 initiates and controls installations, updates, and de-installations of applications for the user devices. The service manager 218 manages the types of services supported for the user devices. The service manager provides information to the smart content routing unit 214 for transferring the connected-date-set among the user devices and the content router server. The setting change dispatcher 220 provides changes in device settings from the device manager to the user devices. The device state storage 222 stores the information about the operating states of the user devices.

The device description storage 206 stores type descriptions 224, transcodings 226, account templates 228, and service descriptions 230 of the user devices 110 supported by the connected-data service. The device manager associates user devices with different combinations of type descriptions, transcodings, account templates, and service descriptions such that each of the combinations may be tested and verified for a predefined group of user devices. As a result, different service lines containing corresponding device characteristics and services may be provided to different groups of users.

The protocol adapters 208 may include a provisioning unit 232, a record exchange unit 234, a setting exchange unit 236, an application exchange unit 238, a SyncML unit 240, and other adaptor units 242. Note that the functional units of the device manager described above (i.e. logical blocks 202-244) may be implemented in software, hardware, or a combination of software and hardware. The interactions among the functional units are further described in U.S. application Ser. No. 11/182.663, entitled "System and Method for Provisioning a User Device," to Markus Meyer et al., which is hereby incorporated by reference in its entirety.

Figure 2B:
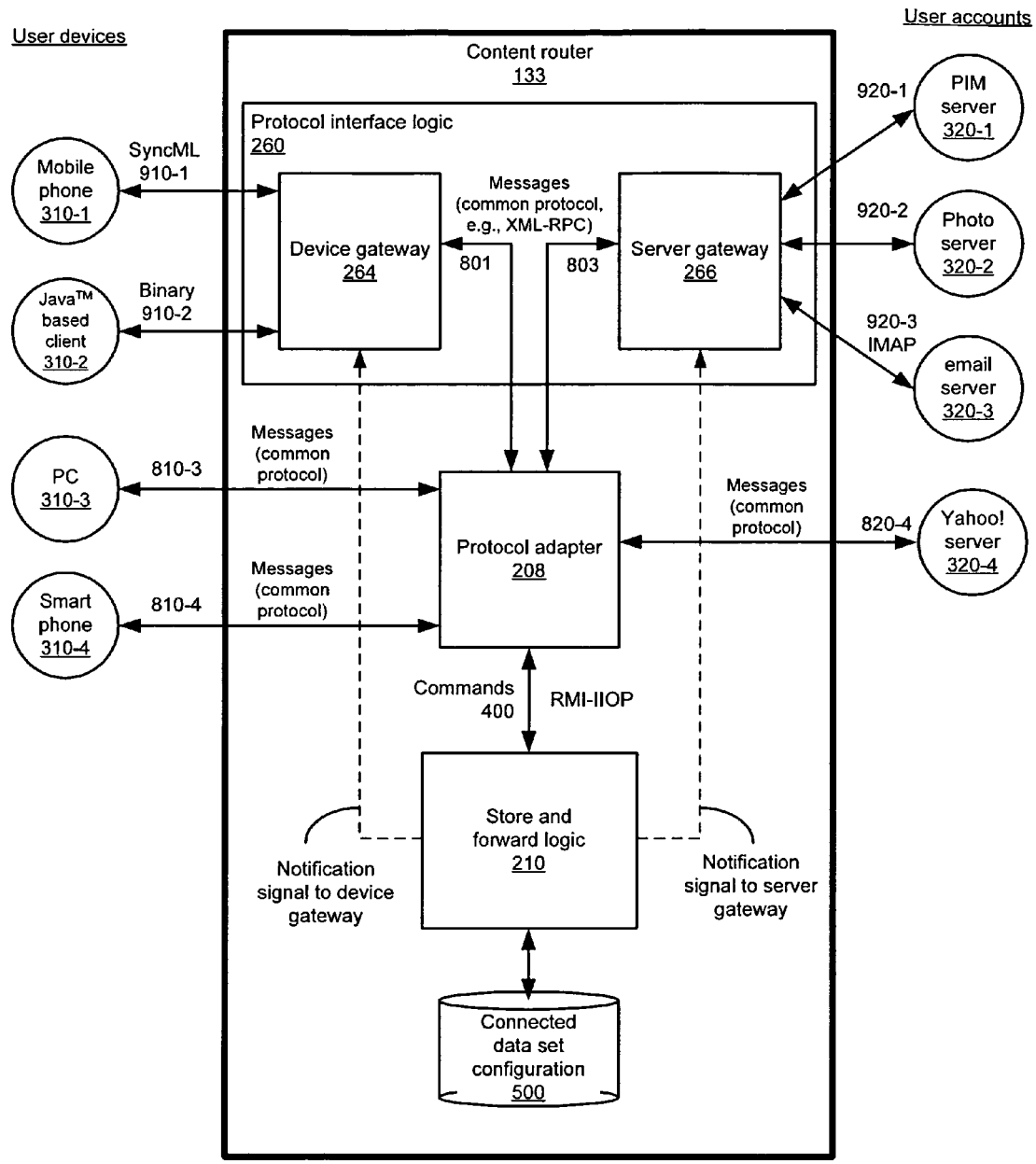
FIG. 2B illustrates an implementation of the content router of FIG. 1B according to an embodiment of the present invention.

FIG. 2B illustrates an implementation of the content router of FIG. 1B according to an embodiment of the present invention. The content router 133 includes store and forward logic 210, a protocol adapter 208, and protocol interface logic 260 including a device gateway 264 and a server gateway 266. The device gateway 264 and a server gateway 266 translate between protocols used by devices and servers and a common protocol, such as an XML-RPC protocol. The protocol adapter 208 translates between the common protocol and commands 400 used to communicate with the store and forward logic 210. Commands 400 sent between the store and forward logic 210 and the protocol adapter 208 may be in a request-response scheme such as in a Java™ platform including a Remote Method Invocation over Internet Inter-ORB Protocol (RMI-IIOP) technology interface. A Java RMI platform allows an object running on a Java enabled content node to invoke methods on an object running in a Java based store and forward logic 210 and vice versa. Furthermore, the content router 133 may configure the device gateway 264 and/or the server gateway 266 with one or more of the routing parameters and/or one or more of the transformation parameters, such that the gateway may perform routing and transformations on commands of a content node.

The device gateway 264 is shown coupling the protocol adapter 208 to a mobile phone 310-1 running a SyncML protocol 910-1 and a Java™ based client device 310-2 operating with a binary protocol 910-2. The server gateway 266 is shown coupling the protocol adapter 208 to a PIM server 320-1, a photo server 320-2, and an email server 320-3 with protocols 920-1, 920-2, and 920-3, respectively.

A common protocol, such as XML-RPC, allows applications running on disparate operating systems and in different environments to make remote procedure calls using HTTP as a transport layer and XML as an encoding scheme. The XML-RPC protocol allows complex data structures to be transmitted from an application running on the device gateway 264, the server gateway 266, an XML-RPC-enabled device, or an XML-RPC-enabled server to the protocol adapter 208 and the store and forward logic 210. The protocol adapter 208 or the store and forward logic 210 may process the received data structure and return a result to the application.

Content nodes having the capability to communicate using the common protocol may bypass the gateway and may communicate directly with the protocol adapter 208. For example, a Symbian device or a WinCE, Win32 or home personal computer (PC) 310-3 running a client application may communicate directly with the protocol adapter 208, which avoids the device gateway 264, since the PC 310-3 already employs the common protocol. Additionally, a smart phone 310-4 may also communicate using the common protocol avoid the device gateway 264. Similarly, user accounts may use the common protocol thereby bypassing the server gateway 266 to communicate with the protocol adapter 208. As shown, a Yahoo!® server 320-4 uses the common protocol thereby avoiding the server gateway 266. In some embodiments, a content node communicates with commands 400 directly (not shown), and thus may avoid using a protocol adapter 208.

By using a common protocol, the protocol adapter 208 may treat messages 801 from device gateway 264, messages 803 from a server gateway 266, messages 810-3, 810-4 from user devices 310-3, 310-4 and messages 820-4 from user accounts 320-4 similarly, thereby simplifying the design and implementation of the protocol adapter 208. Therefore, incoming messages in the common protocol are treated similarly regardless of input path to the protocol adapter 208. As a result, the store and forward logic 210 may treat commands from each content node similarly.

The content router 133 may also include a notification signal (dotted line) sent from the store and forward logic 210 to a device and/or server gateway 264, 266 as shown in FIG. 2B. If an outgoing command is waiting in the outgoing queue, the store and forward logic 210 may periodically send a notification signal (dotted lines) to the appropriate gateway 264, 266. A notification may be send from the store and forward logic 210 to the gateway 264, 266 using telnet, HTTP, a custom API, or the like. The gateway 264, 266 then may initiate a request for the outgoing command or commands 400 from the store and forward logic 210. The gateway 264, 266 may receive a response including the command from the outgoing queue.

In some embodiments, after a gateway 264, 266 receives a notification signal and fetches an outgoing command, the gateway prepares an outgoing notification message containing the command. If the outgoing command is relatively small in size, the gateway 264, 266 may include the command within the notification.

According to some embodiments, the store and forward logic 210 determines that a notification may be sent to a content node to inform the content node that the outgoing queue (within the store and forward logic 210) may contain an outgoing command. The store and forward logic 210 generates a notification signal for a gateway 264, 266. The gateway 264, 266 receives a notification signal from the store and forward logic 210. The notification signal may indicate availability of an outgoing command in the outgoing queue for a content node. In response to receiving the notification signal, the gateway 264, 266 may request the outgoing command, for example, by a call to the protocol adapter 208. The protocol adapter 208 retrieves the command from the store and forward logic 210, which provides it to the gateway 264, 266. The gateway 264, 266 receives the response containing the outgoing command. The gateway 264, 266 prepares an outgoing notification containing the outgoing command. The gateway 264, 266 may encode the outgoing command into a compact binary sequence. The gateway 264, 266 then sends the outgoing notification to the content node, which may be either a user device 310 such as a mobile phone or a user account 320 such as an email account. For example, a device gateway 264 may send the outgoing notification to a mobile phone by way of an SMS gateway. The gateway 264, 266 may send an acknowledgement of the outgoing notification to the store and forward logic 210 via the protocol adapter 208. Note that the functional units of the content router 133 described above may be implemented in software, hardware, or a combination of software and hardware. The interactions among the functional units of the content router are further described in U.S. application Ser. No. 11/182,287, entitled "Content Router," to Torsten Schulz et al., which is hereby incorporated by reference in its entirety.

Figure 14:
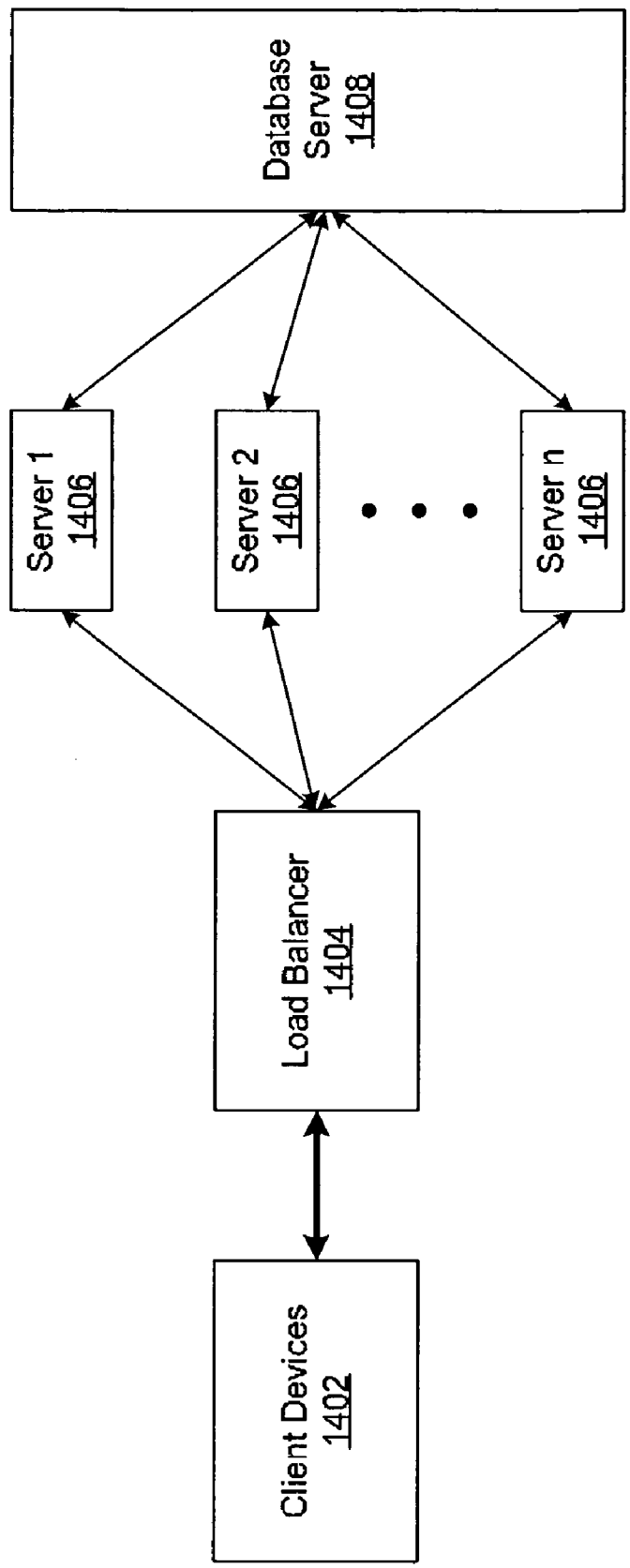
FIG. 14 illustrates a prior art system for servicing user accounts.

As described above, each blade implements a CRS. One benefit of this approach is that it eliminates the need for synchronizing or accessing data through a very fast network from other machines as required by the prior art system shown in FIG. 14. In this approach, accessing a central point, such as the large central database of FIG. 14, is no longer part of the normal flow of providing data to user devices. The scalable software blade architecture ensures that a failure of the blade manager (central point) does not impact the service of the user accounts at each individual blade. Since the central point may not be up and running all the time, the method ensures that if this central point fails, the normal flow still works.

Note that configurations information such as the connectivity of devices and accounts (which device is connected to which account and what filters are set), and filters are backed up. The system is able to recover with that configuration data only. Therefore, the amount of backup data and number of backup calls per device are reduced.

Content data are not permanently stored in a blade. The blade is able to recover from a server crash without that data. With this approach, the user does not lose data, because user data is fetched and dispatched from the user devices and user accounts. Global data is hosted by the blade manager. A blade polls the blade manager from time to time for changes to the configuration data, retrieves and stores the changes in a local cache on the blade. Exchanging user content data between blades is done through a store-and-forward mechanism as described above in association with FIG. 2B.

Figure 3:
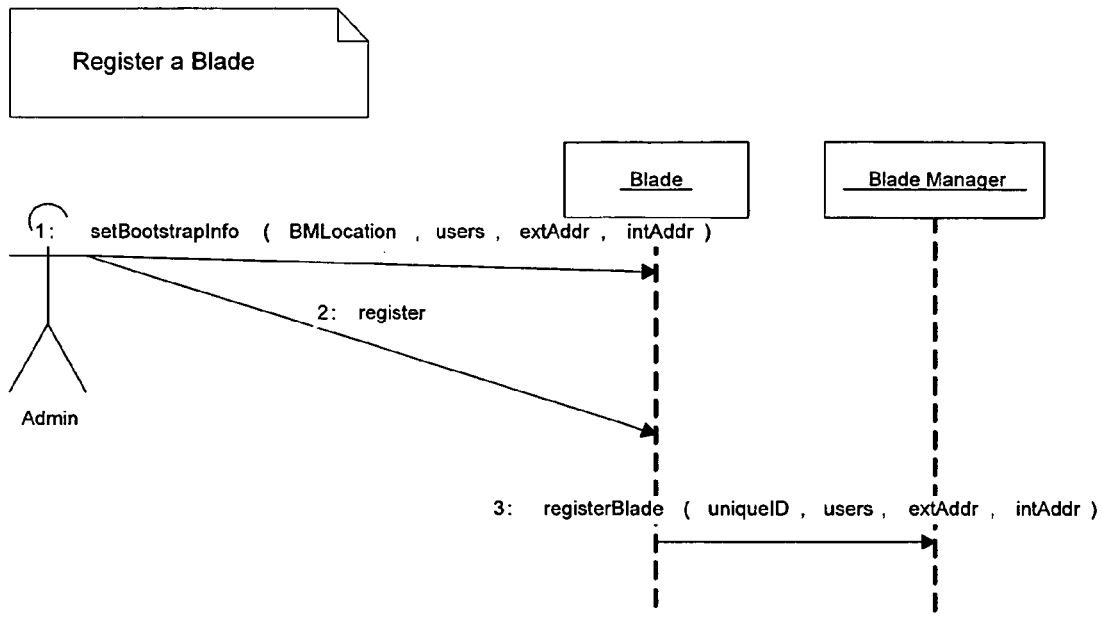
FIG. 3 illustrates a sequence diagram for registering a blade according to an embodiment of the present invention.

FIG. 3 illustrates a sequence diagram for registering a blade according to an embodiment of the present invention. It is desirable to simplify the steps to register or revoke a new blade in the deployment. In step 1, the administrator calls the function setBootstrapInfo to set the location of the blade manager and provides the external and internal address of the blade. The blade manager assigns the number of user accounts to be hosted by the blade. Note that in another embodiment, the administrator may be implemented as an automatic process. In step 2, the administrator calls the function register that allows the blade to register itself at the blade manager. Next in step 3, the blade calls the function registerBlade to register itself at the partition manager within the blade manager. Note that the blade manager, which is the first node in the deployment, needs to be known by all other blades. There is no special process registering or revoking it. The blade manager proxy also registers itself at the blade manager.

Figure 4:
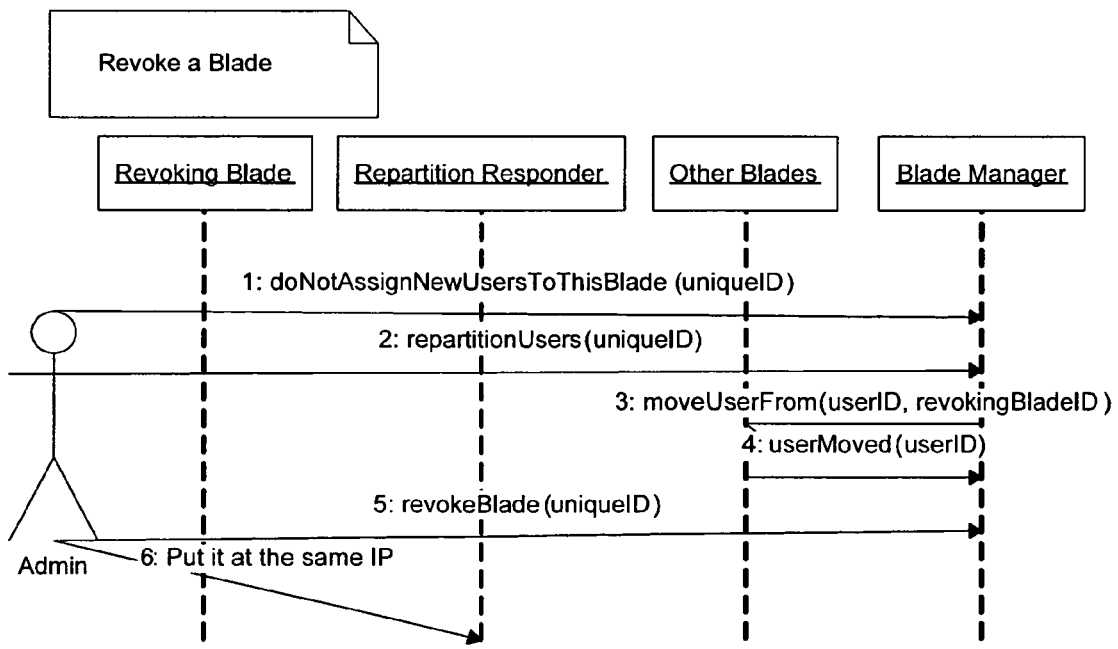
FIG. 4 illustrates a sequence diagram for revoking a blade according to an embodiment of the present invention.

FIG. 4 illustrates a sequence diagram for revoking a blade according to an embodiment of the present invention. First in step 1, the administrator calls the function doNotAssignNewUsersToThisBlade and stops the blade manager from assigning new users to the blade to be revoked. Then in step 2, the administrator calls the function repartitionUsers to repartition the user accounts from the blade that is to be revoked. In step 3, the blade manager calls the function moveUserFrom to inform the blades that should take over the users about moving user accounts from the blade. This procedure is further described below in association with repartitioning a user. In step 4, after a user has been moved, the new blade calls the function userMoved to inform the blade manager about the move. This information is used by the administrator to determine that all users have been moved. In step 5, after the administrator determines that the user accounts for all users have been repartitioned, it calls the function revokeBlade to revoke the blade. In step 6, the administrator installs a new blade using the same IP address; this corresponds to a move command for the devices. The administrator may install other information that responds to the devices with a move command. After step 6, a device that tries to connect to the revoked blade is redirected to go through the blade manager proxy. The blade manager proxy directs the device to the new blade. If the device does not get a proper response, it waits for a predetermined period of time (for example an hour) before contacting the blade manager proxy for accessing the blade.

Figure 5:
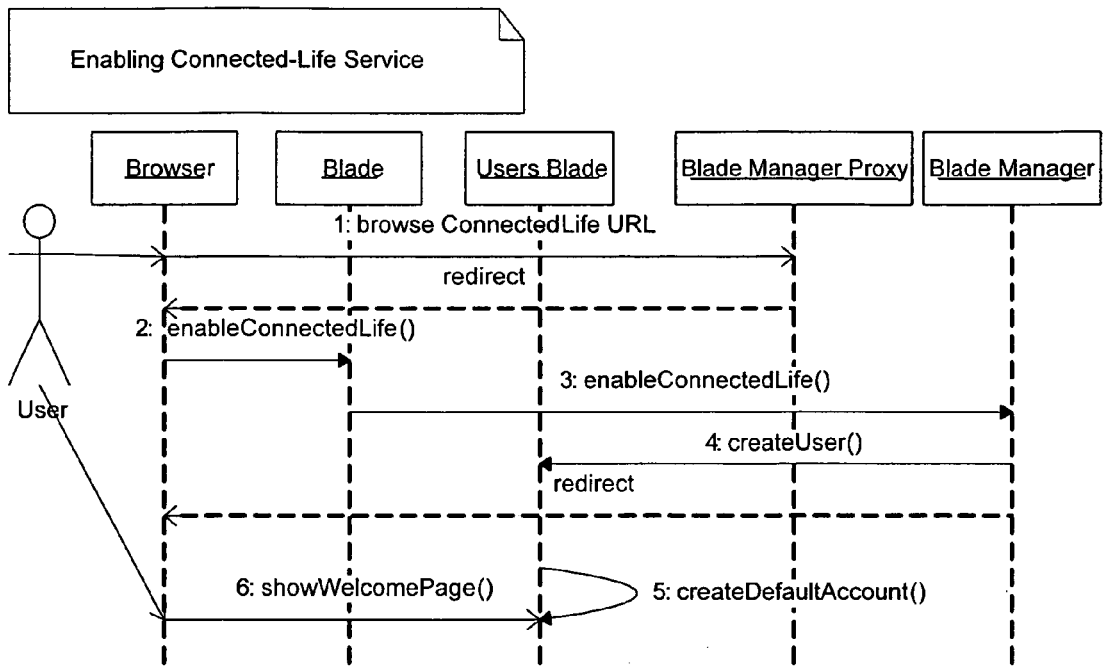
FIG. 5 illustrates a sequence diagram for creating a user according to an embodiment of the present invention.

FIG. 5 illustrates a sequence diagram for creating a user according to an embodiment of the present invention. In step 1, the user browses the CRS sign-in URL. The target of this URL is the blade manager proxy. The blade manager proxy redirects the URL to one of the blades. In step 2, the user selects "register" and enters the information to enable the CRS on the blade through the enableConnectedLife function call. In step 3, the enableConnectedLife call is delegated to the blade manager that performs the task of enabling the connected-data service. Not shown in this diagram is that the blade manager has a connection to the service provider's user management system that handles this activity. In step 4, the blade manager calls the function createUser to the blade where the user should be created. The blade needs to be up and running (online) to perform this step. This ensures that the user already exists before the browser is redirected to that blade. In step 5, the blade calls the function createDefaultAccount to create a default user account. In step 6, the browser accesses the blade and displays the connected-data service welcome page. Note that step 6 may be performed before step 5 or vice versa.

Figure 6:
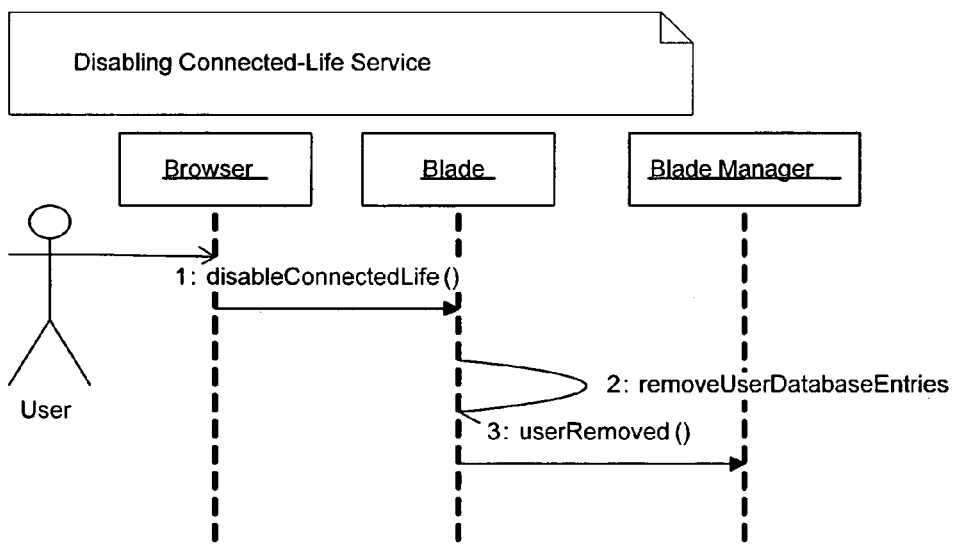
FIG. 6 illustrates a sequence diagram for removing a user according to an embodiment of the present invention.

FIG. 6 illustrates a sequence diagram for removing a user according to an embodiment of the present invention. In step 1, the user calls the function disableConnectedLife to disable the CRS. In step 2, the blade calls the function removeUserDatabaseEntries to remove the user. This process is performed offline, because un-installation of the devices needs to be completed first. After a specific period of time (for example two hours), the user may be removed nevertheless without un-installation of the devices. In step 3, the blade calls the function userRemoved to inform the blade manager that the user has been removed.

Figure 7:
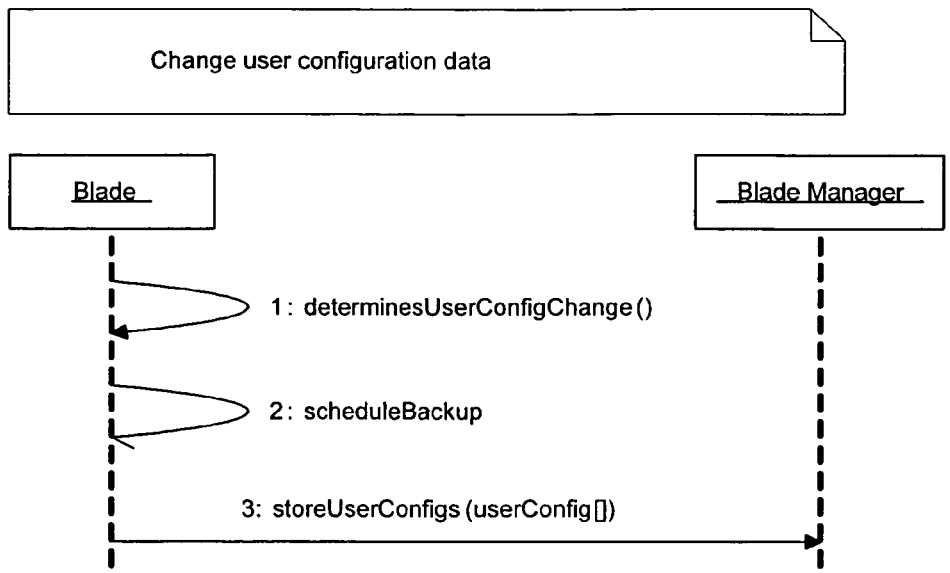
FIG. 7 illustrates a sequence diagram for changing user configuration data according to an embodiment of the present invention.

FIG. 7 illustrates a sequence diagram for changing user configuration data according to an embodiment of the present invention. In step 1, the blade calls the function determinesUserConfigChange to detect that user configuration data has changed. Note that this data is changed through user interaction, such as adding a new device, adding a new account, or adding a new address-book in an account. Under normal conditions, changes happen infrequently. In one example, a user configuration data includes a) connection information between account and devices; b) device and account attributes like name, password, and phone number; and c) user specific data such as location, language, and profile. In step 2, if a change is detected, the blade calls the function scheduleBackup to schedule an offline (asynchronous) backup. It is necessary that this step does not depend on the blade manager to be online, such that the system may work even if the blade manager is down. In step 3, the blade calls the function storeUserConfigs to store the user configuration data in the blade manager as an XML document, which is a relatively small amount of data about the size of 3 to 5 kilobytes. Thus, the task of storing user configuration data may be accomplished in one function call.

Figure 8:
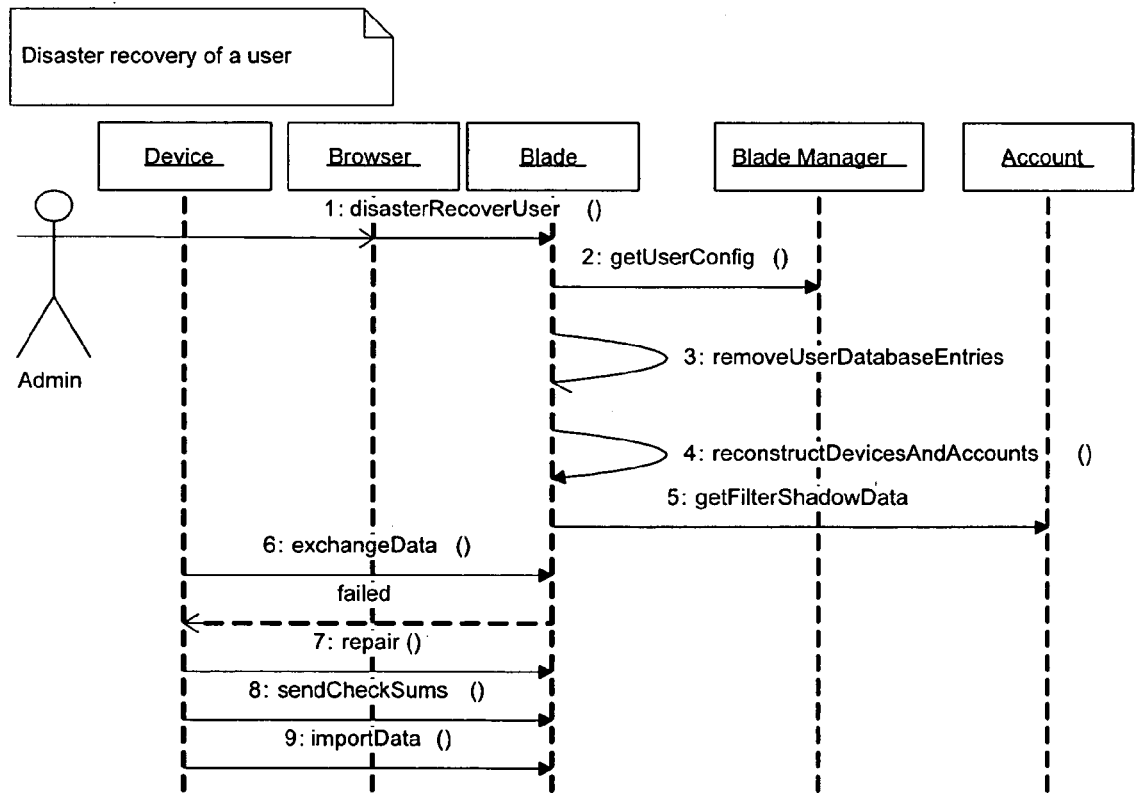
FIG. 8 illustrates a sequence diagram for disaster recovery of a user according to an embodiment of the present invention.

FIG. 8 illustrates a sequence diagram for disaster recovery of a user according to an embodiment of the present invention. In step 1, upon determining a user is in a bad state, the administrator calls the function disasterRecoverUser at the blade where the user resides. This initiates the process of recreating the user account from the user configuration data. Note that the user configuration data is stored in a backup, which may be updated every time the user configuration data changes. In step 2, the blade calls the function getUserConfig to retrieve the user configuration data from the blade manager. In step 3, the blade calls the function removeUserDatabaseEntries to remove the user's database entries. In step 4, the blade calls the function reconstructDevicesAndAccounts to reconstruct accounts and devices from the user configuration. In step 5, the blade calls the function getFilterShadowData to trigger the process of importing filter information for all accounts. In step 6, the device calls the function exchangeData to exchange data. It gets back a special return code that indicates a repair is necessary. In step 7, the device calls the function repair to perform the repair. Note that steps 5 and 6 are different for SyncML and MMS devices. For SyncML, a slow sync is performed to import data from the backend. For MMS, no importation of content data from the backend is necessary, because only the newest mail is sent to the phone. In step 8, the device calls the function sendCheckSums to send a checksum. This is an optimization procedure to avoid software reinstallation and/or getting and putting all data contents again. In step 9, the device calls the function importData to import the PIM data again in response to the checksum and information indicating whether the data on the device is up-to-date.

Figure 9:
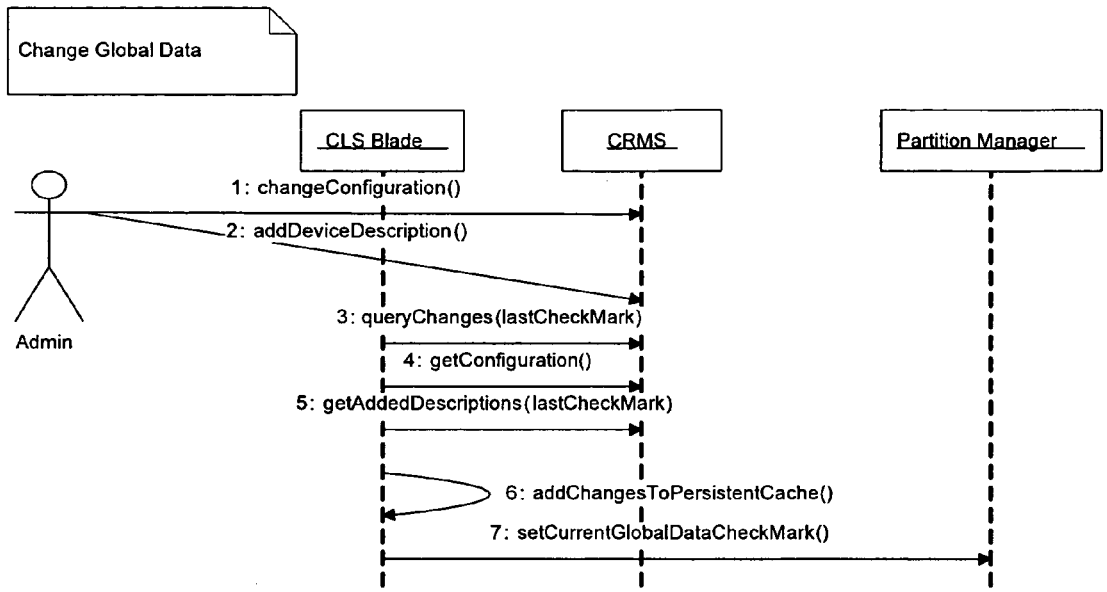
FIG. 9 illustrates a sequence diagram for changing global data according to an embodiment of the present invention.

FIG. 9 illustrates a sequence diagram for changing global data according to an embodiment of the present invention. The global data changes on the CRMS first, where the CRMS is part of the blade manager. The blades receive this information with polling. The global data is exchanged as XML documents or as zip-packages through which documents and device binaries are assembled. The global data is required to be backward compatible. In other words, a set of new global data needs to be able to work with existing blades. Thus, the set of new global data needs to be proven stable before the set of old global data is removed. For example, if the SMTP server changes, the old global data still needs to be made available until all blades are updated to the set of new global data.

As shown in FIG. 9, in step 1, the administrator calls the function changeConfiguration to change a configuration value. In step 2, the administrator calls the function addDeviceDescription to add a device type description. In step 3, the CRMS reflects the changes. Each blade is responsible to determine what has changed by calling the function queryChanges. This call returns the information that has changed. In this example, the configuration and device descriptions have changed. In step 4, the blade calls the function getConfiguration to request the user configuration data. In step 5, the blade calls the function getAddedDescriptions to fetch the newest device descriptions. In step 6, the blade calls the function addChangesToPersistentCache to store the changed information and/or data in a persistent cache of the blade. In step 7, the blade calls the function setCurrentGlobalDataCheckMark to inform the partition manager about global data that is in the persistent cache. This information is used to determine when all blades perform the update of global data. For example, after all blades update to the new configuration version, where the new SMPP server is configured, then the old configuration can be removed from the system.

Figure 10:
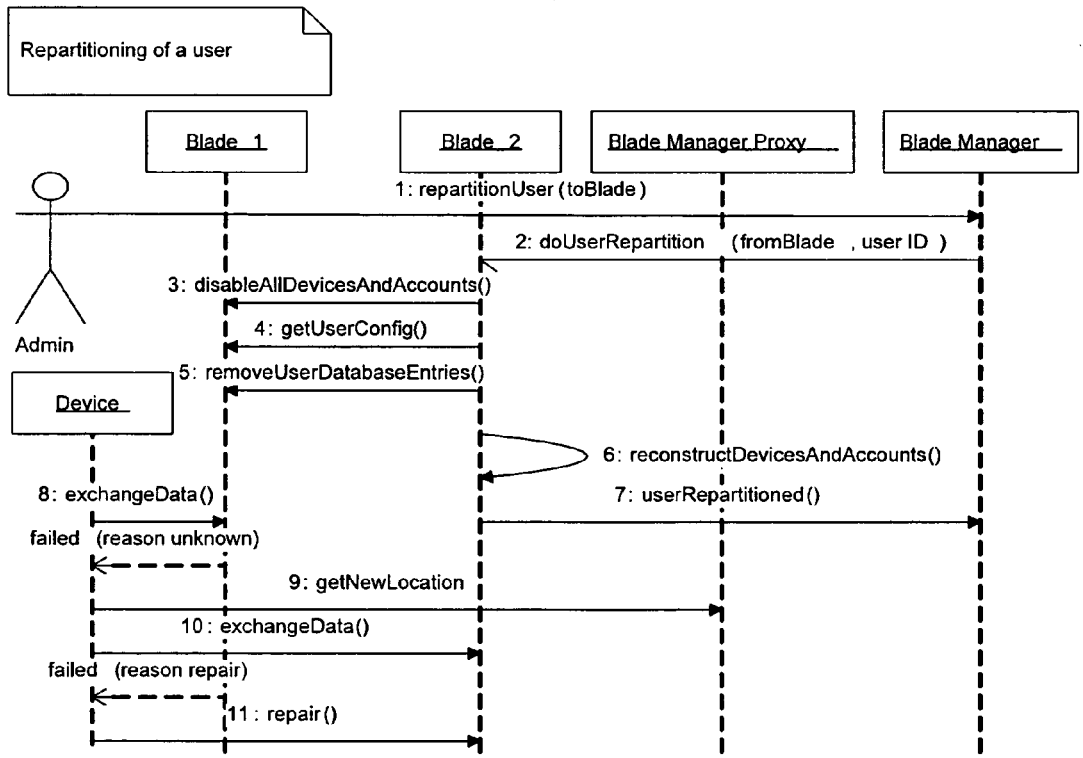
FIG. 10 illustrates a sequence diagram for repartitioning a user according to an embodiment of the present invention.

FIG. 10 illustrates a sequence diagram for repartitioning a user according to an embodiment of the present invention. This sequence diagram describes a process where a user account is moved from blade 1 to blade 2. In step 1, the administrator calls the function repartitionUser to trigger the repartitioning process at a blade manager. In step 2, the partition manager calls the function doUserRepartition to inform blade 2 to perform the task of repartitioning. In step 3, blade 2 calls the function disableAllDevicesAndAccounts to disable all external communication for the user on blade 1. In step 4, blade 2 calls the function getUserConfig to get the user configuration from blade 1. It goes to blade 1 instead of the blade manager because changes of user configuration data may not have been delivered from blade 1 to the blade manager. In step 5, blade 2 calls the function removeUserDatabaseEntries to direct blade 1 to remove all user related data. After this call, blade 1 may not update the user configuration due to the possibility of creating potential race conditions. In step 6, blade 2 calls the function reconstructDevicesAndAccounts to re-create user accounts and devices. In step 7, blade 2 calls the function userRepartitioned to inform the blade manager that the user has been moved successfully. After this call, blade 2 updates the user configuration data. In step 8, the device calls the function exchangeData to access blade 1 for the exchanged data. It still does not know about the move. Since blade 1 no longer has information about the user (and the user's devices and accounts) after the move, it returns an error indicating that this device is unknown. In step 9, the error returned in step 8 prompts the device to query the blade manager proxy for the new location of the device by calling the function getNewLocation. In step 10, the device calls the function exchangeData to access the new location on blade 2 and to exchange data. Blade 2 responds with a code that the device should initiate a repair process. In step 11, the device calls the function repair to initiate the repair process. In addition, it calls functions sendCheckSum and importData similar to the situation of disaster recovery of a user as described in FIG. 8.

Figure 11:
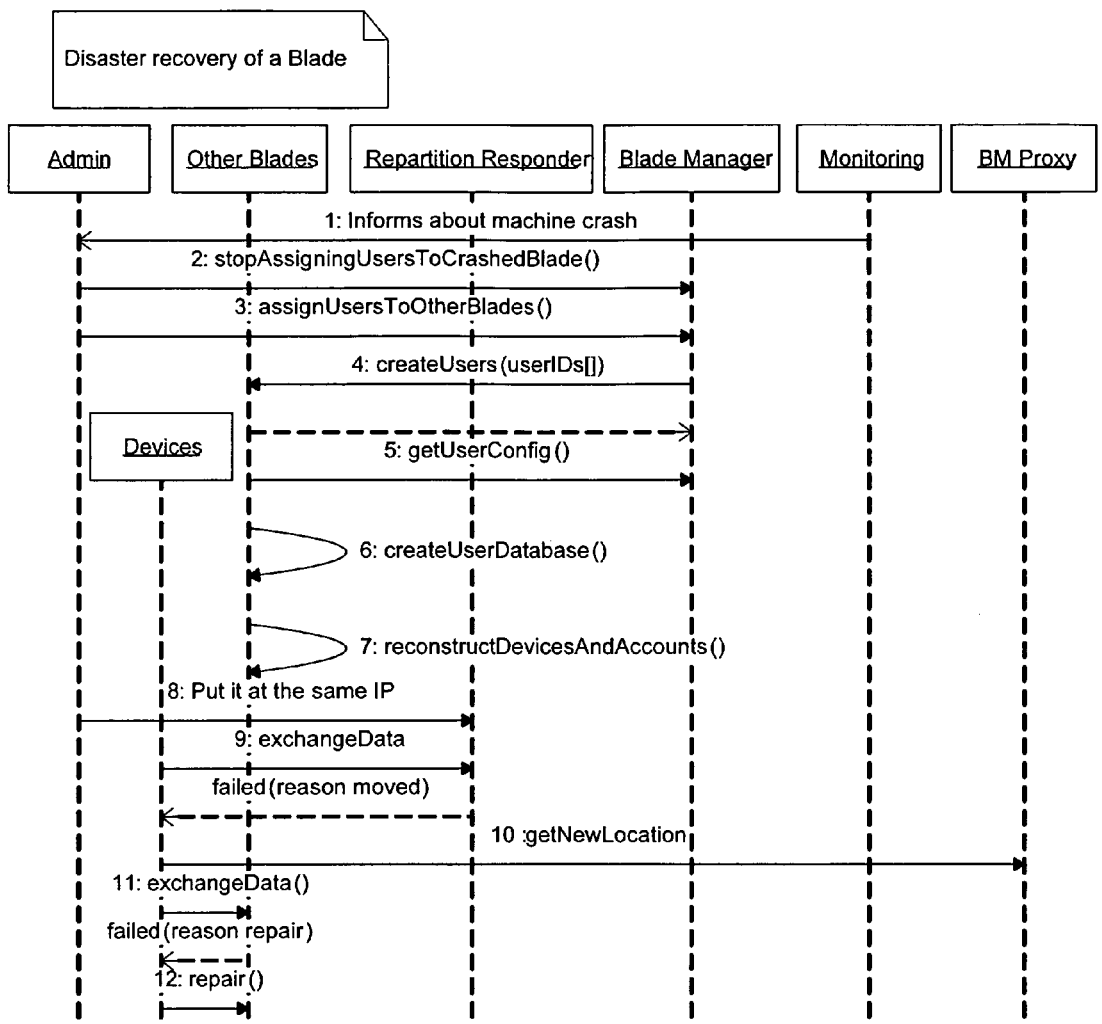
FIG. 11 illustrates a sequence diagram for disaster recovery of a blade according to an embodiment of the present invention.

FIG. 11 illustrates a sequence diagram for disaster recovery of a blade according to an embodiment of the present invention. This sequence diagram describes the scenario when a blade has crashed and the data on the disk is lost. In step 1, a blade monitoring tool determines that the blade has crashed and informs the administrator. In step 2, the administrator calls the function stopAssigningUsersToCrashedBlade to stop assigning users to the crashed blade. In step 3, the administrator calls the function assignUsersToOtherBlades to direct the blade manager to move the users to other blades in the system. In step 4, the blade manager calls the function createUsers to create new users on other blades. Note that by distributing the users to multiple blades, the peak load during disaster recovery is reduced. Next, steps 5 to 12 are performed for moving a user account and its associated user devices. In step 5, the blades call the function getUserConfig to fetch the user configuration. In step 6, the blades call the function createUserDatabase to create database entries. In step 7, the blades call the function reconstructDevicesAndAccounts to create the devices and accounts using the user configuration information. In step 8, the administrator provides the IP address at a repartition responder that directs the device to move. Steps 9-12 describe the process for moving the devices. These steps are similar to the user repartition case described above.

Figure 12A:
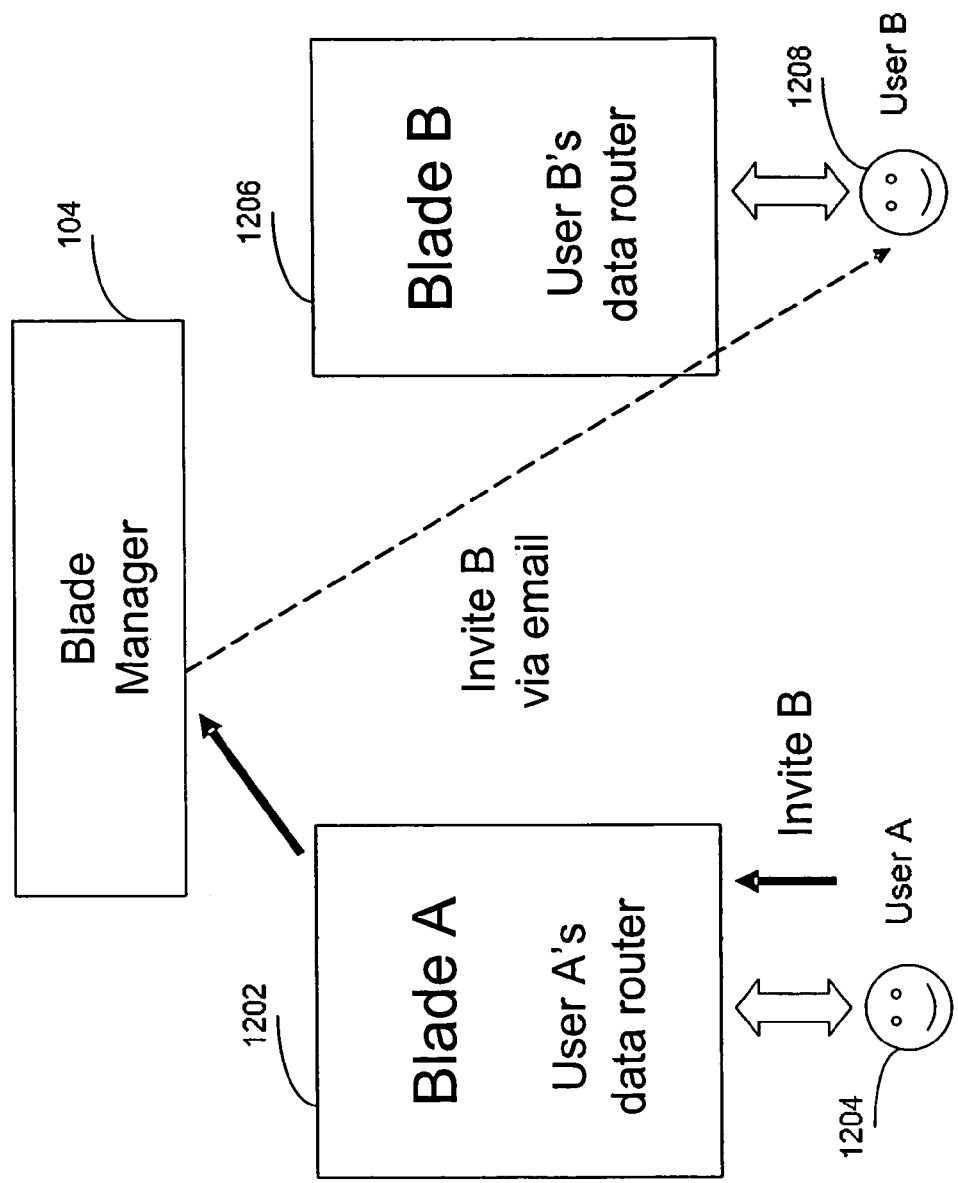
FIG. 12A illustrates a method for inviting a user from a different blade to share data according to an embodiment of the present invention.

FIGS. 12A-12D describe a method for sharing data between two users on different blades according to embodiments of the present invention. FIG. 12A illustrates a method for inviting a user from a different blade to share data according to an embodiment of the present invention. As shown in FIG. 12A, blade A 1202 implements the CRS of user A 1204 and functions as the data router for user A. Similarly, blade B 1206 implements the CRS of user B 1208 and functions as the data router for user B. A blade manages a user's data. For example, blade A manages the data of user A and blade B manages the data of user B. Both blade A and blade B are managed by the blade manager 104 as described above.

To invite user B to share data, user A creates an invite B message and sends the message to blade A. Blade A passes the invitation to the blade manager. Next, the blade manager determines whether user B exists and has access to the connected-data service. If user B does not exist or has no access to the connected-data service, a notification is sent to user A regarding the status of the invitation. In the alternative, if user B does exist and has access to the connected-data service, the blade manager sends the invitation message to user B (shown as the dotted line). Note that the invitation message may be presented in various formats such as electronic mail, instant messenger, or hyperlink to a webpage. In another approach, the blade manager may delegate the task of sending the invitation message to blade B.

Figure 12B:
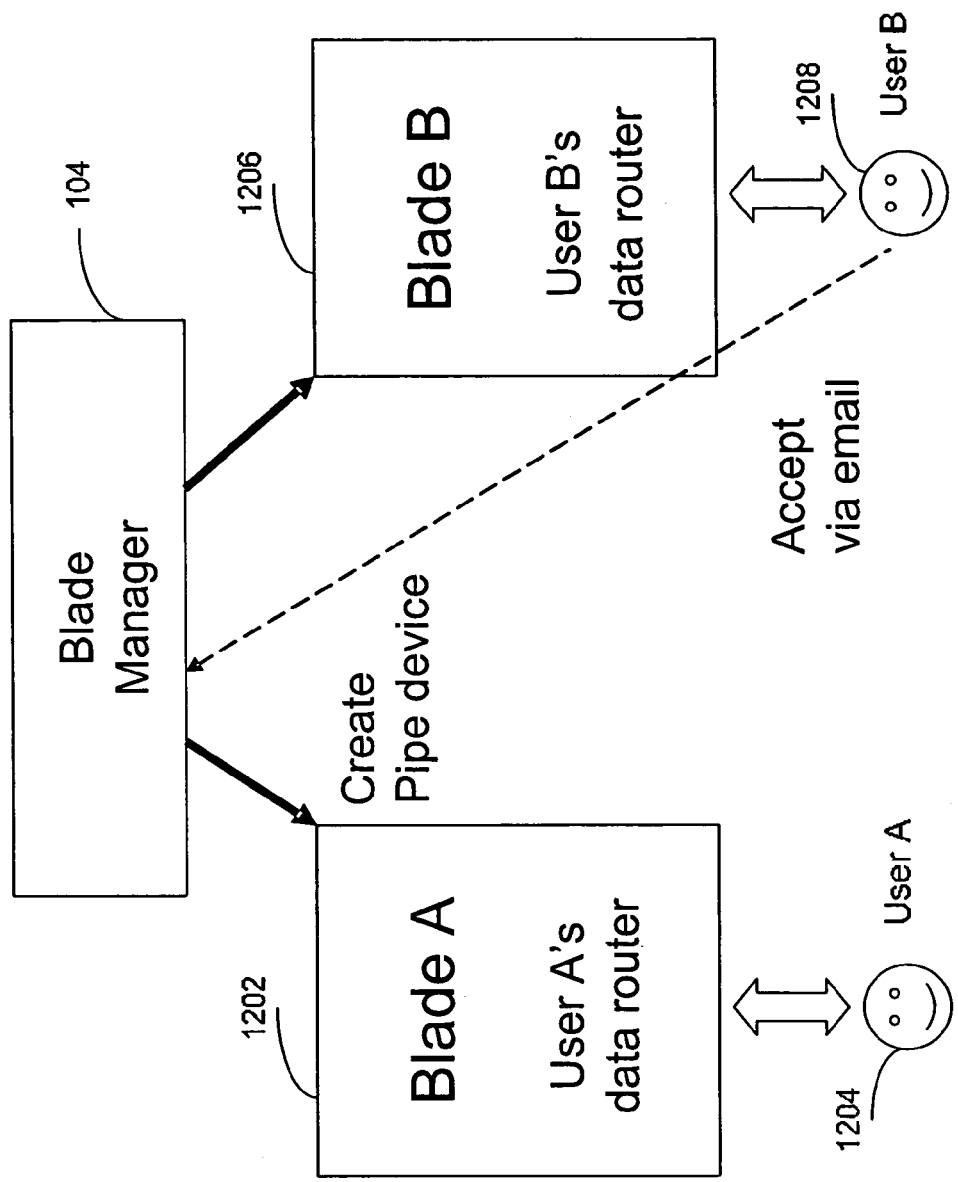
FIG. 12B illustrates a method for accepting the invitation to share data of FIG. 12a according to an embodiment of the present invention.
Figure 12C:
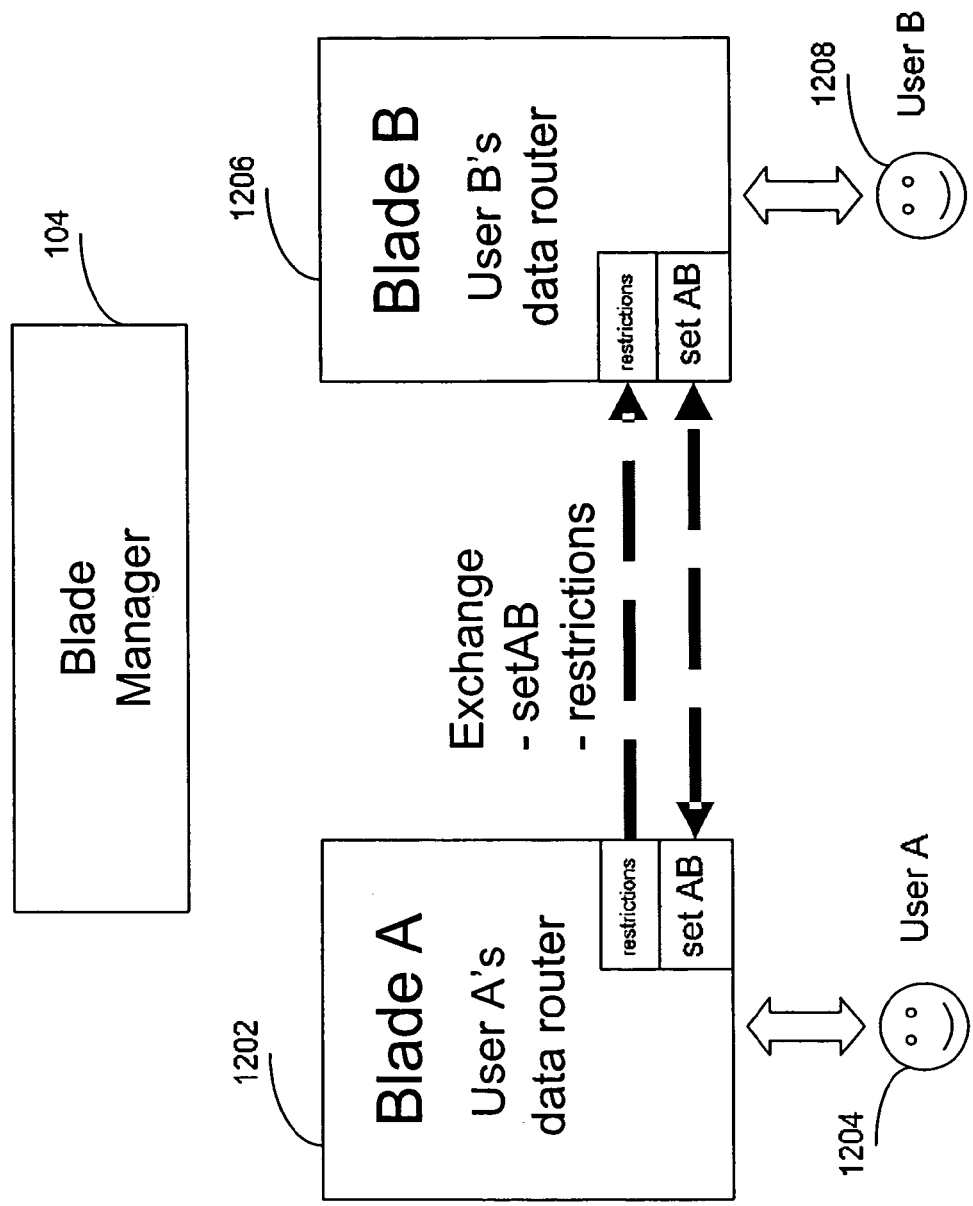
FIG. 12C illustrates connections between blade A and blade B for User A and User B to share data according to an embodiment of the present invention.

FIG. 12B illustrates a method for accepting the invitation to share data of FIG. 12A according to an embodiment of the present invention. As shown in FIG. 12B, user B 1208 sends an acceptance (shown as dotted line) to share data with user A 1204 through the blade manager 104. After receiving the acceptance from user B, the blade manager creates connections between blade A 1202 and blade B 1206 for user A and user B to share data. FIG. 12C illustrates connections between blade A and blade B for user A and user B to share data. according to an embodiment of the present invention. On blade A, a dataset AB to be shared between user A and user B is defined by user A. In addition, the corresponding access restrictions for the dataset AB are defined by user A for user B. Next, the dataset AB and its corresponding access restrictions are forwarded from blade A to blade B. Note that the access restrictions stored on blade B is an executable version of the access restrictions on blade A.

Figure 12D:
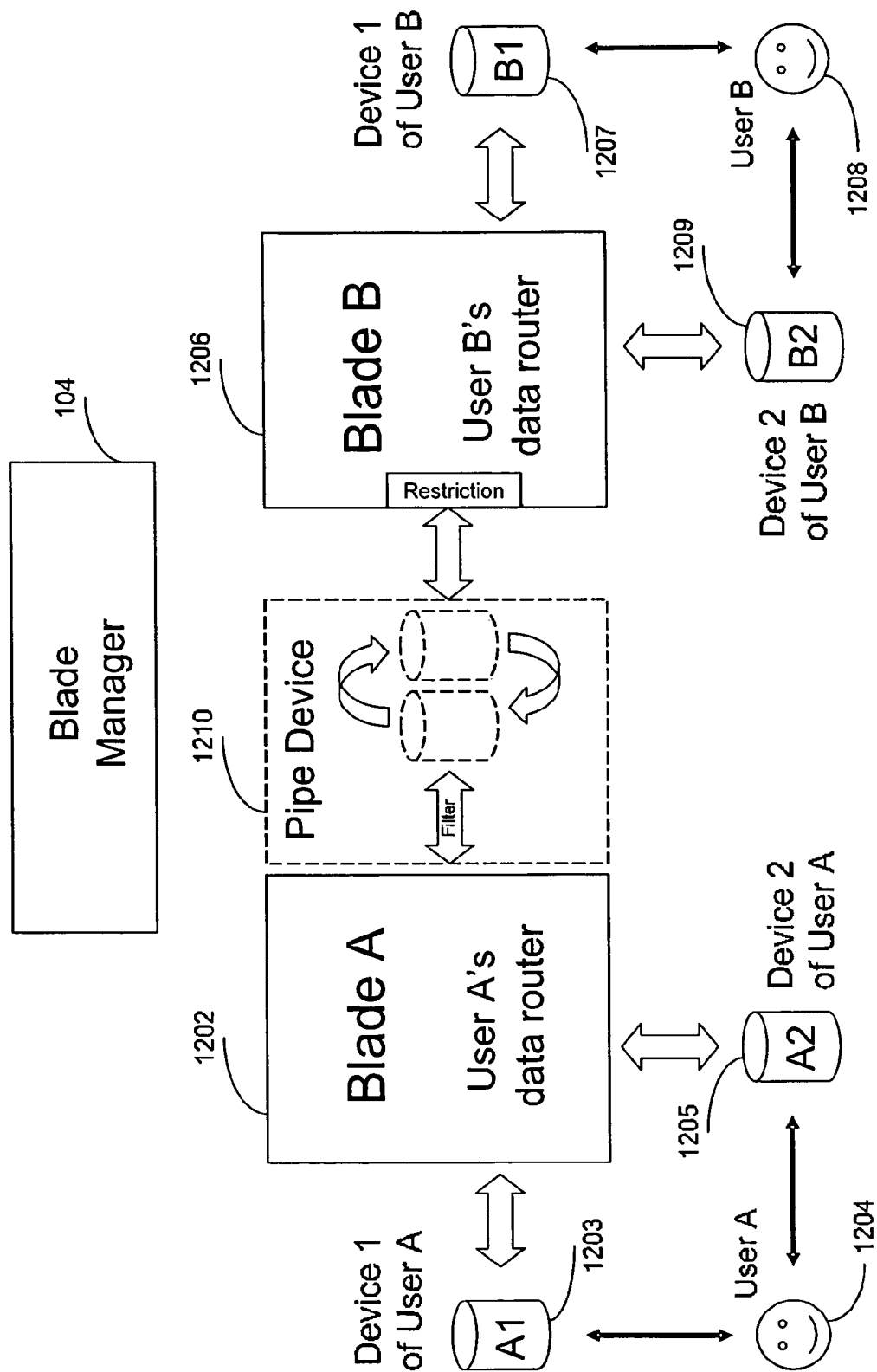
FIG. 12D illustrates a method for sharing data between two users on different blades using a pipe device according to an embodiment of the present invention.

FIG. 12D illustrates a method for sharing data between two users on different blades using a pipe device according to an embodiment of the present invention. As shown in FIG. 12D, blade A 1202 is the CRS for user A 1204, which may have one or more user devices such as A1 1203 and A2 1205. Blade B 1206 is the CRS for user B 1208, which may also have one or more user devices such as B1 1207 and B2 1209. A virtual pipe device 1210 (shown as dotted line) is created between blade A and blade B for propagating changes of shared data between user A and user B. In particular, the pipe device propagates dataset AB and subsequent changes to dataset AB made by user A from blade A to blade B. In addition, the pipe device propagates access restrictions of dataset AB and subsequent changes to the access restrictions of dataset AB made by user A from blade A to blade B. In this implementation, the pipe device acts as a proxy of the first user from the perspective of the second blade, and acts as a proxy of the second user from the perspective of the first blade.

The pipe device receives changes to dataset AB made by user B, and checks for access restrictions given to user B with respect to the dataset AB. If user B is not authorized to modify the dataset AB, no change will be made to the dataset AB. In the alternative, if user B is authorized to modify the dataset AB, then the dataset AB is modified by user B. The changes to dataset AB are propagated by the pipe device from blade B to blade A. Therefore by using the pipe device, user B can access the dataset AB on blade B without accessing blade A, and access restrictions for user B to the dataset AB are enforced without accessing blade A.

Figure 13:
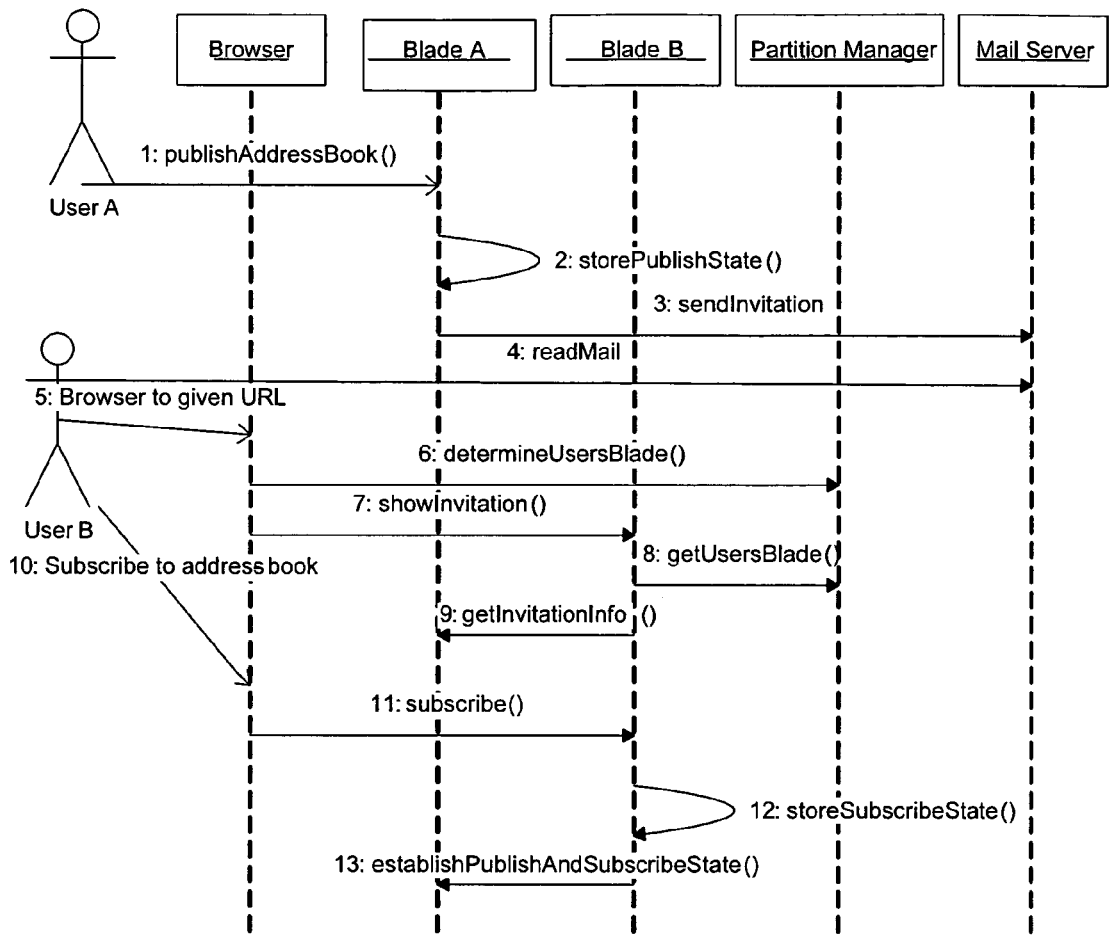
FIG. 13 illustrates a sequence diagram for sharing data between users hosted by different blades according to an embodiment of the present invention.

FIG. 13 illustrates a sequence diagram for sharing data between users hosted by different blades according to an embodiment of the present invention. In step 1, user A calls the function publishAddressBook on blade A to publish his address book (an example of content data), to user B. In step 2, blade A calls the function storePublishState to store the publish state. An inventory is kept on who published to whom. This call also triggers an asynchronous backup to the CRMS (not shown in the diagram). In step 3, blade A sends out an invitation to the mail server. In step 4, user B calls the function readMail to get and read the mail. In step 5, user B selects the URL provided in the mail. In step 6, the URL refers to the partition manager, which is a part of the blade manager. The partition manager detects the user's blade B and redirects the user to blade B. In step 7, the browser requests the page to show the invitation. In step 8, since the information that is published is not found on the blade B, blade B calls the function getUserBlade to inquire the partition manager about the destination of the information. In the invitation request, the publisher's unique name is included. In step 9, blade B calls the function getInvitationInfo to get from blade A the information about the invitation. This is a synchronous request, which requires both blades and the partition manager be up and running. In step 10, user B accepts the invitation and subscribes to the address book. In step 11, the browser calls the function subscribe to send the subscription request to blade B. In step 12, blade B calls the function storeSubscribeState to store the subscription state. This causes an asynchronous backup to the CRMS (not shown in the diagram). In step 13, blade B calls the function establishPublishAndSubscribeState to establish a connection between blade B and blade A. This includes the store and forward mechanism used to access external devices. Also, a notification channel from blade A to blade B is established to inform the changes of the published data.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controller. Hence, references to specific functional units are to be seen as references to suitable means for providing the described functionality rather than indicative of a strict logical or physical structure or organization.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. A system for servicing user accounts, comprising:
one or more blades for servicing the user accounts, wherein each blade includes software components and hardware components, and wherein each blade serves a group of user accounts;
at least one memory comprising computer-executable instructions, wherein the instructions are for:
receiving a notification of a failed blade among the one or more blades;
stopping assignment of new user accounts to the failed blade;
moving user accounts from the failed blade to at least one other blade,
wherein moving user accounts comprises providing configuration information of the user accounts to the at least one other blade, the configuration information stored separately from the failed blade;
receiving a notification of a failed user device; and
recovering the failed user device, wherein recovering the failed user device comprises:
retrieving configuration information from a blade manager;
removing database entries of the user device at a blade of the one or more blades;
reconstructing a user account and a user device from the configuration information; and
importing filter data for the user account and the user device; and
a processor operable to execute the instructions.

2. The system of claim 1, wherein the at least one memory further comprises instructions for:
maintaining user settings, global configurations and preferences, device descriptions, and account groups at a blade manager; and
providing the user settings, global configurations and preferences, device descriptions, and account groups to the one or more blades.

3. The system of claim 2, wherein user settings comprise:
filter settings;
sharing settings;
type of services; and
type of user devices.

4. The system of claim 1 further comprising a blade monitoring tool for:
monitoring whether a blade has failed;
monitoring whether data on the blade has been lost; and
providing a user-readable indication concerning the failed blade.

5. The system of claim 1, wherein moving user accounts further comprises:
providing configuration information of the user accounts from another blade;
creating new user accounts at the at least one other blade using the configuration information; and
providing Internet Protocol addresses of new locations of the user accounts at a blade manager.

6. The system of claim 1, wherein the at least one memory further comprises instructions for:
   receiving a signal for accessing the failed blade from a user device; and
   returning an error message to the user device.

7. The system of claim 6, wherein the at least one memory further comprises instructions for:
   receiving a first inquiry, at a blade manager, from the user device for a new blade location;
   returning to the user device information concerning the new blade location;
   receiving a second inquiry to access the new blade location from the user device;
   informing the user device to initiate a repair process; and
   performing repair operations for the user device in response to receiving a repair request from the user device.

8. The system of claim 1, wherein the at least one memory further comprises instructions for:
   receiving a signal for exchanging data from the user;
   returning a code indicating that a repair operation on the user device is required; and
   performing the repair operation by initiating an installation of a connected-data service and a corresponding connected dataset for the user device.

9. A method for servicing user accounts, comprising:
   partitioning tasks for servicing the user accounts into one or more blades, wherein each blade includes software components and hardware components, and wherein each blade serves a group of user accounts;
   detecting a failed blade among the one or more blades;
   stopping assignment of new user accounts to the failed blade;
   moving user accounts from the failed blade to at least one other blade, wherein moving user accounts comprises providing configuration information of the user accounts to the at least one other blade, the configuration information stored separately from the failed blade;
   receiving a notification of a failed user device; and
   recovering the failed user device, wherein recovering the failed user device comprises:
      retrieving configuration information from a blade manager;
      removing database entries of the user device at a blade of the one or more blades;
      reconstructing a user account and a user device from the configuration information; and
      importing filter data for the user account and the user device.

10. The method of claim 9 further comprising:
    maintaining user settings, global configurations and preferences, device descriptions, and account groups at a blade manager; and
    providing the user settings, global configurations and preferences, device descriptions, and account groups to the one or more blades.

11. The method of claim 10, wherein user settings comprise:
    filter settings;
    sharing settings;
    type of services; and
    type of user devices.

12. The method of claim 9, wherein detecting comprises:
    monitoring whether a blade has failed;
    monitoring whether data on the blade has been lost; and
    providing a user-readable indication concerning the failed blade.

13. The method of claim 9, wherein moving user accounts further comprises:
    fetching configuration information of the user accounts from another blade;
    creating new user accounts at the at least one other blade using the configuration information; and
    providing Internet Protocol addresses of new locations of the user accounts at a blade manager.

14. The method of claim 9, further comprising:
    receiving a signal for accessing the failed blade from a user device; and
    returning an error message to the user device.

15. The method of claim 14 further comprising:
    receiving a first inquiry, at a blade manager, from the user device for a new blade location;
    returning to the user device information concerning the new blade location;
    receiving a second inquiry to access the new blade location from the user device;
    informing the user device to initiate a repair process; and
    performing repair operations for the user device in response to a repair request from the user device.

16. The method of claim 9 further comprising:
    receiving a signal for exchanging data from the user;
    returning a code indicating a repair operation on the user device is required; and
    performing the repair operation by initiating an installation of a connected-data service and a corresponding connected dataset for the user device.

17. A computer readable medium comprising instructions for:
    partitioning tasks for servicing the user accounts into one or more blades, wherein each blade includes software components and hardware components, and wherein each blade serves a group of user accounts;
    detecting a failed blade among the one or more blades;
    stopping assignment of new user accounts to the failed blade;
    moving user accounts from the failed blade to at least one other blade, wherein moving user accounts comprises providing configuration information of the user accounts to the at least one other blade, the configuration information stored separately from the failed blade;
    receiving a notification of a failed user device; and
    recovering the failed user device, wherein recovering the failed user device comprises:
       retrieving configuration information from a blade manager;
       removing database entries of the user device at a blade of the one or more blades;
       reconstructing a user account and a user device from the configuration information; and
       importing filter data for the user account and the user device.

18. The computer readable medium of claim 17 further comprising instructions for:
    maintaining user settings, global configurations and preferences, device descriptions, and account groups at a blade manager; and
    providing the user settings, global configurations and preferences, device descriptions, and account groups to the one or more blades.

19. The computer readable medium of claim 18, wherein user settings comprise:
    filter settings;
    sharing settings;
    type of services; and
    type of user devices.

20. The computer readable medium of claim 17, wherein detecting comprises:
   monitoring whether a blade has failed;
   monitoring whether data on the blade has been lost; and
   providing a user-readable indication concerning the failed blade.

21. The computer readable medium of claim 17 further comprising instructions for:
   fetching configuration information of the user accounts from another blade;
   creating new user accounts at the at least one other blade using the configuration information; and
   providing Internet Protocol addresses of new locations of the user accounts at a blade manager.

22. The computer readable medium of claim 17 further comprising instructions for:
   receiving a signal for accessing the failed blade from a user device; and
   returning an error message to the user device.

23. The computer readable medium of claim 22 further comprising instructions for:
   receiving a first inquiry, at a blade manager, from the user device for a new blade location;
   returning to the user device information concerning the new blade location;
   receiving a second inquiry to access the new blade location from the user device;
   informing the user device to initiate a repair process; and
   performing repair operations for the user device in response to a repair request from the user device.

24. The computer readable medium of claim 17 further comprising instructions for:
   receiving a signal for exchanging data from the user;
   returning a code indicating a repair operation on the user device is required; and
   performing the repair operation by initiating an installation of a connected-data service and a corresponding connected dataset for the user device.

25. The system of claim 1, wherein the at least one memory further comprises instructions for creating new user accounts on the at least one other blade.

26. The method of claim 9 further comprising creating new user accounts on the at least one other blade.

27. The computer readable medium of claim 17 further comprising instructions for creating new user accounts on the at least one other blade.

* * * * *